US008401018B2

(12) United States Patent
Meylan et al.

(10) Patent No.: US 8,401,018 B2
(45) Date of Patent: Mar. 19, 2013

(54) METHOD AND APPARATUS FOR SCHEDULING IN A WIRELESS NETWORK

(75) Inventors: Arnaud Meylan, San Diego, CA (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 998 days.

(21) Appl. No.: 11/086,085

(22) Filed: Mar. 21, 2005

(65) Prior Publication Data

US 2005/0270975 A1  Dec. 8, 2005

Related U.S. Application Data

(60) Provisional application No. 60/576,721, filed on Jun. 2, 2004.

(51) Int. Cl.
*H04W 72/00* (2009.01)

(52) U.S. Cl. ............ 370/395.4; 370/449; 370/468

(58) Field of Classification Search ........... 370/229, 370/230, 230.1, 231, 232, 235, 238, 395.21, 370/395.4, 395.41, 395.52; 455/450–452.2; 713/503; 718/102–105
See application file for complete search history.

(56) References Cited

U.S. PATENT DOCUMENTS

| | | | |
|---|---|---|---|
| 4,747,100 A | 5/1988 | Roach et al. |
| 4,750,171 A | 6/1988 | Kedar et al. |
| 5,081,623 A | 1/1992 | Ainscow et al. |
| 5,133,081 A | 7/1992 | Mayo et al. |
| 5,276,703 A | 1/1994 | Budin et al. |
| 5,280,476 A | 1/1994 | Kojima et al. |
| 5,297,144 A | 3/1994 | Gilbert et al. |
| 5,384,777 A | 1/1995 | Ahmadi et al. |
| 5,444,702 A | 8/1995 | Burnett et al. |
| 5,638,371 A | 6/1997 | Raychaudhuri et al. |
| 5,677,909 A | 10/1997 | Heide et al. |
| 5,684,791 A | 11/1997 | Raychaudhuri et al. |
| 5,719,868 A | 2/1998 | Young et al. |
| 5,729,542 A | 3/1998 | Dupont et al. |
| 5,818,842 A | 10/1998 | Burwell et al. |
| 5,923,650 A | 7/1999 | Chen et al. |

(Continued)

FOREIGN PATENT DOCUMENTS

| | | |
|---|---|---|
| CN | 1263675 | 8/2000 |
| CN | 1350733 | 5/2002 |

(Continued)

OTHER PUBLICATIONS

Mangold, et al.: "IEEE 802.11e Wireless LAN for Quality of Service," Feb. 2002, pp. 1-8, XP002251598.

(Continued)

*Primary Examiner* — Habte Mered
(74) *Attorney, Agent, or Firm* — Linda G. Gunderson

(57) ABSTRACT

Techniques for scheduling flows and links for transmission are described. Each link is an oriented source-destination pair and carries one or more flows. Each flow may be associated with throughput, delay, feedback (e.g., acknowledgments (ACKs)) and/or other requirements. A serving interval is determined for each flow based on the requirements for the flow. A serving interval is determined for each link based on the serving intervals for all of the flows sent on the link. Each link is scheduled for transmission at least once in each serving interval, if system resources are available, to ensure that the requirements for all flows sent on the link are met. The links are also scheduled in a manner to facilitate closed loop rate control. The links are further scheduled such that ACKs for one or more layers in a protocol stack are sent at sufficiently fast rates.

46 Claims, 11 Drawing Sheets

U.S. PATENT DOCUMENTS

| | | | |
|---|---|---|---|
| 5,946,313 | A | 8/1999 | Allan et al. |
| 5,970,059 | A | 10/1999 | Ahopelto et al. |
| 5,974,045 | A | 10/1999 | Ohkura et al. |
| 6,002,691 | A | 12/1999 | Citta et al. |
| 6,014,087 | A | 1/2000 | Krishnakumar et al. |
| 6,069,886 | A | 5/2000 | Ayerst et al. |
| 6,098,142 | A | 8/2000 | Leggett et al. |
| 6,111,927 | A | 8/2000 | Sokoler et al. |
| 6,130,886 | A | 10/2000 | Ketseoglou et al. |
| 6,252,854 | B1 | 6/2001 | Hortensius et al. |
| 6,256,317 | B1 | 7/2001 | Holloway et al. |
| 6,307,846 | B1 | 10/2001 | Willey |
| 6,404,751 | B1 | 6/2002 | Roark et al. |
| 6,433,737 | B2 | 8/2002 | Katz |
| 6,438,104 | B1 | 8/2002 | Fodor et al. |
| 6,452,917 | B1 | 9/2002 | Leung |
| 6,456,599 | B1 | 9/2002 | Elliott et al. |
| 6,483,819 | B1 | 11/2002 | Take et al. |
| 6,504,506 | B1 | 1/2003 | Thomas et al. |
| 6,512,773 | B1 | 1/2003 | Scott et al. |
| 6,532,225 | B1 | 3/2003 | Chang et al. |
| 6,542,490 | B1 | 4/2003 | Ahmadvand et al. |
| 6,553,020 | B1 | 4/2003 | Hughes et al. |
| 6,563,816 | B1 | 5/2003 | Nodoushani et al. |
| 6,574,237 | B1 | 6/2003 | Bullman et al. |
| 6,580,704 | B1 | 6/2003 | Wellig et al. |
| 6,587,441 | B1 | 7/2003 | Urban et al. |
| 6,600,754 | B1 | 7/2003 | Young et al. |
| 6,609,866 | B2 | 8/2003 | Huang et al. |
| 6,611,525 | B1 | 8/2003 | Natanson et al. |
| 6,611,529 | B1 | 8/2003 | Krishnakumar et al. |
| 6,621,805 | B1 | 9/2003 | Kondylis et al. |
| 6,621,827 | B1 | 9/2003 | Rezvani et al. |
| 6,625,171 | B1 | 9/2003 | Matsudo et al. |
| 6,633,564 | B1 | 10/2003 | Steer et al. |
| 6,643,260 | B1 | 11/2003 | Kloth et al. |
| 6,671,511 | B1 | 12/2003 | Forssell et al. |
| 6,724,740 | B1 | 4/2004 | Choi et al. |
| 6,741,635 | B2 | 5/2004 | Lo et al. |
| 6,751,187 | B2 | 6/2004 | Walton et al. |
| 6,751,623 | B1 | 6/2004 | Basso et al. |
| 6,760,388 | B2 | 7/2004 | Ketchum et al. |
| 6,768,730 | B1 | 7/2004 | Whitehill et al. |
| 6,771,706 | B2 | 8/2004 | Ling et al. |
| 6,788,702 | B1 | 9/2004 | Garcia-Luna-Aceves et al. |
| 6,791,962 | B2 | 9/2004 | Wentink et al. |
| 6,791,996 | B1 | 9/2004 | Watanabe et al. |
| 6,795,409 | B1 | 9/2004 | Youssefmir et al. |
| 6,795,418 | B2 | 9/2004 | Choi et al. |
| 6,795,419 | B2 | 9/2004 | Parantainen et al. |
| 6,813,260 | B1 | 11/2004 | Fogle et al. |
| 6,847,626 | B1 | 1/2005 | Carneal et al. |
| 6,868,133 | B2 | 3/2005 | Hicks et al. |
| 6,898,441 | B1 | 5/2005 | Kogiantis et al. |
| 6,907,020 | B2 | 6/2005 | Periyalwar et al. |
| 6,912,225 | B1 | 6/2005 | Kohzuki et al. |
| 6,944,688 | B1 | 9/2005 | Batcher et al. |
| 6,961,311 | B2 | 11/2005 | Rakotoarivelo et al. |
| 6,963,549 | B1 | 11/2005 | Jayaraman et al. |
| 6,977,944 | B2 | 12/2005 | Brockmann et al. |
| 7,006,848 | B2 | 2/2006 | Ling et al. |
| 7,031,274 | B2 | 4/2006 | Sherman |
| 7,031,287 | B1 | 4/2006 | Ho et al. |
| 7,046,639 | B2 | 5/2006 | Garcia-Luna-Aceves et al. |
| 7,046,654 | B2 | 5/2006 | Chen |
| 7,046,690 | B2 | 5/2006 | Sherman |
| 7,058,074 | B2 | 6/2006 | Ho et al. |
| 7,065,144 | B2 | 6/2006 | Walton et al. |
| 7,068,633 | B1 | 6/2006 | Ho |
| 7,079,552 | B2 | 7/2006 | Cain et al. |
| 7,082,117 | B2 | 7/2006 | Billhartz et al. |
| 7,085,281 | B2 | 8/2006 | Thomas et al. |
| 7,092,737 | B2 | 8/2006 | Horng et al. |
| 7,095,732 | B1 | 8/2006 | Watson, Jr. et al. |
| 7,099,300 | B2 | 8/2006 | Sugaya et al. |
| 7,099,671 | B2 | 8/2006 | Liang |
| 7,116,652 | B2 | 10/2006 | Lozano |
| 7,123,627 | B2 | 10/2006 | Kowalski et al. |
| 7,130,289 | B2 | 10/2006 | Kuan et al. |
| 7,142,527 | B2 | 11/2006 | Garcia-Luna-Aceves et al. |
| 7,145,895 | B2 | 12/2006 | Mueckenheim et al. |
| 7,149,245 | B2 | 12/2006 | Budka et al. |
| 7,154,876 | B2 | 12/2006 | Benveniste et al. |
| 7,158,504 | B2 | 1/2007 | Kadaba et al. |
| 7,158,803 | B1 | 1/2007 | Elliott |
| 7,187,691 | B2 | 3/2007 | Gavette et al. |
| 7,203,192 | B2 | 4/2007 | Desai et al. |
| 7,206,083 | B2 | 4/2007 | Shimada |
| 7,236,459 | B1 * | 6/2007 | Okholm et al. ............... 370/231 |
| 7,260,073 | B2 | 8/2007 | Sipola et al. |
| 7,263,083 | B2 | 8/2007 | Kisigami et al. |
| 7,266,087 | B2 | 9/2007 | Wahl et al. |
| 7,269,152 | B2 | 9/2007 | Vukovic et al. |
| 7,274,707 | B2 | 9/2007 | Choi et al. |
| 7,277,149 | B2 | 10/2007 | Kim et al. |
| 7,277,419 | B2 | 10/2007 | McGowan et al. |
| 7,277,430 | B2 | 10/2007 | Ono et al. |
| 7,280,513 | B2 | 10/2007 | Cao et al. |
| 7,284,260 | B2 | 10/2007 | Hilts et al. |
| 7,301,924 | B1 | 11/2007 | Gurbuz et al. |
| 7,301,944 | B1 | 11/2007 | Redmond et al. |
| 7,313,104 | B1 | 12/2007 | Kern et al. |
| 7,330,877 | B2 | 2/2008 | Kandala et al. |
| 7,333,556 | B2 | 2/2008 | Maltsev et al. |
| 7,336,642 | B2 | 2/2008 | Rich et al. |
| 7,342,940 | B2 | 3/2008 | Park |
| 7,366,202 | B2 | 4/2008 | Scherzer et al. |
| 7,372,855 | B2 | 5/2008 | Kandala |
| 7,400,641 | B2 | 7/2008 | Nitschke et al. |
| 7,400,642 | B2 | 7/2008 | Koo et al. |
| 7,417,974 | B2 * | 8/2008 | Hansen ............... 370/334 |
| 7,440,573 | B2 | 10/2008 | Lor et al. |
| 7,450,550 | B2 | 11/2008 | Jin et al. |
| 7,512,070 | B2 * | 3/2009 | Stephens ............... 370/235 |
| 7,525,994 | B2 | 4/2009 | Scholte |
| 7,564,814 | B2 | 7/2009 | Abraham et al. |
| 7,570,656 | B2 | 8/2009 | Raphaeli et al. |
| 7,599,340 | B2 | 10/2009 | Chandra et al. |
| 7,633,946 | B2 | 12/2009 | Pavon et al. |
| 7,639,657 | B1 | 12/2009 | Ho et al. |
| 7,676,236 | B2 | 3/2010 | Nanda et al. |
| 7,706,399 | B2 * | 4/2010 | Janczak ............... 370/449 |
| 7,724,721 | B2 | 5/2010 | Lim et al. |
| 7,818,018 | B2 | 10/2010 | Nanda et al. |
| 7,869,432 | B1 | 1/2011 | Mollyn |
| 7,881,340 | B2 | 2/2011 | Farrag et al. |
| 8,233,462 | B2 | 7/2012 | Walton et al. |
| 2001/0024173 | A1 | 9/2001 | Katz et al. |
| 2001/0046220 | A1 | 11/2001 | Koo et al. |
| 2001/0053141 | A1 | 12/2001 | Periyalwar et al. |
| 2001/0053695 | A1 | 12/2001 | Wallentin |
| 2002/0009999 | A1 | 1/2002 | Lee et al. |
| 2002/0021698 | A1 | 2/2002 | Lee et al. |
| 2002/0022483 | A1 | 2/2002 | Thompson et al. |
| 2002/0046257 | A1 | 4/2002 | Killmer et al. |
| 2002/0067736 | A1 | 6/2002 | Garcia-Luna-Aceves et al. |
| 2002/0071413 | A1 | 6/2002 | Choi et al. |
| 2002/0071449 | A1 | 6/2002 | Ho et al. |
| 2002/0093929 | A1 | 7/2002 | Mangold et al. |
| 2002/0110101 | A1 | 8/2002 | Gopalakrishnan et al. |
| 2002/0172186 | A1 | 11/2002 | Larsson et al. |
| 2002/0172217 | A1 | 11/2002 | Kadaba et al. |
| 2002/0174219 | A1 | 11/2002 | Mei et al. |
| 2002/0191703 | A1 | 12/2002 | Ling et al. |
| 2003/0002605 | A1 | 1/2003 | Lo et al. |
| 2003/0003880 | A1 | 1/2003 | Ling et al. |
| 2003/0015611 | A1 | 1/2003 | Teng et al. |
| 2003/0043732 | A1 | 3/2003 | Walton et al. |
| 2003/0050084 | A1 | 3/2003 | Damnjanovic et al. |
| 2003/0063563 | A1 * | 4/2003 | Kowalski ............... 370/230 |
| 2003/0072280 | A1 * | 4/2003 | McFarland et al. ...... 370/332 |
| 2003/0076797 | A1 | 4/2003 | Lozano et al. |
| 2003/0087605 | A1 | 5/2003 | Das et al. |
| 2003/0108117 | A1 | 6/2003 | Ketchum et al. |
| 2003/0125040 | A1 | 7/2003 | Walton et al. |
| 2003/0128684 | A1 | 7/2003 | Hirsch et al. |
| 2003/0133441 | A1 | 7/2003 | Watanabe et al. |

| | | |
|---|---|---|
| 2003/0147385 A1 | 8/2003 | Montalvo et al. |
| 2003/0162519 A1 | 8/2003 | Smith et al. |
| 2003/0169763 A1 | 9/2003 | Choi et al. |
| 2003/0174645 A1 | 9/2003 | Paratainen et al. |
| 2003/0174680 A1 | 9/2003 | Kuan et al. |
| 2003/0198312 A1 | 10/2003 | Budka et al. |
| 2003/0202574 A1 | 10/2003 | Budka et al. |
| 2003/0223365 A1* | 12/2003 | Kowalski .................... 370/230.1 |
| 2003/0223418 A1 | 12/2003 | Desai et al. |
| 2004/0017823 A1 | 1/2004 | Kim et al. |
| 2004/0022213 A1* | 2/2004 | Choi et al. .................... 370/332 |
| 2004/0042556 A1 | 3/2004 | Medvedev et al. |
| 2004/0047319 A1 | 3/2004 | Elg et al. |
| 2004/0063455 A1 | 4/2004 | Eran et al. |
| 2004/0082356 A1 | 4/2004 | Walton et al. |
| 2004/0105386 A1* | 6/2004 | Sipola ........................ 370/230.1 |
| 2004/0109433 A1* | 6/2004 | Khan ............................ 370/345 |
| 2004/0120349 A1 | 6/2004 | Border et al. |
| 2004/0125778 A1 | 7/2004 | Lin et al. |
| 2004/0131019 A1* | 7/2004 | Kandala ....................... 370/311 |
| 2004/0141522 A1 | 7/2004 | Texerman et al. |
| 2004/0151199 A1 | 8/2004 | Sykes et al. |
| 2004/0156345 A1 | 8/2004 | Steer et al. |
| 2004/0156367 A1* | 8/2004 | Albuquerque et al. .... 370/395.4 |
| 2004/0163129 A1 | 8/2004 | Chapman et al. |
| 2004/0184567 A1 | 9/2004 | McDonough et al. |
| 2004/0204101 A1 | 10/2004 | Qiu et al. |
| 2004/0204104 A1 | 10/2004 | Horng et al. |
| 2004/0246934 A1 | 12/2004 | Kim |
| 2004/0252664 A1* | 12/2004 | Cao et al. ........................ 370/335 |
| 2004/0258039 A1* | 12/2004 | Stephens ....................... 370/349 |
| 2004/0258091 A1 | 12/2004 | Meyer et al. |
| 2004/0264504 A1 | 12/2004 | Jin et al. |
| 2004/0266451 A1 | 12/2004 | Stolyar et al. |
| 2005/0036475 A1 | 2/2005 | Nishiyama et al. |
| 2005/0047429 A1 | 3/2005 | Koo et al. |
| 2005/0053003 A1 | 3/2005 | Cain et al. |
| 2005/0053064 A1 | 3/2005 | Wang |
| 2005/0058078 A1 | 3/2005 | Jung et al. |
| 2005/0111462 A1* | 5/2005 | Walton et al. ............. 370/395.4 |
| 2005/0135284 A1 | 6/2005 | Nanda et al. |
| 2005/0135291 A1 | 6/2005 | Ketchum et al. |
| 2005/0135295 A1 | 6/2005 | Walton et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0152314 A1* | 7/2005 | Sun et al. ...................... 370/334 |
| 2005/0152465 A1 | 7/2005 | Maltsev et al. |
| 2005/0239407 A1 | 10/2005 | Foore et al. |
| 2006/0052088 A1* | 3/2006 | Pavon et al. ................ 455/414.1 |
| 2006/0092871 A1 | 5/2006 | Nishibayashi et al. |
| 2006/0099956 A1 | 5/2006 | Harada et al. |
| 2006/0159123 A1 | 7/2006 | Fleury et al. |
| 2006/0164969 A1 | 7/2006 | Malik et al. |
| 2006/0165021 A1 | 7/2006 | Tian et al. |
| 2006/0165036 A1 | 7/2006 | Chandra et al. |
| 2006/0193294 A1 | 8/2006 | Jorswieck et al. |
| 2006/0227801 A1 | 10/2006 | Nanda et al. |
| 2006/0268886 A1 | 11/2006 | Sammour et al. |
| 2006/0274844 A1 | 12/2006 | Walton et al. |
| 2007/0037548 A1 | 2/2007 | Sammour et al. |
| 2007/0037564 A1 | 2/2007 | Imamura et al. |
| 2007/0058543 A1 | 3/2007 | Fenart et al. |
| 2007/0058605 A1 | 3/2007 | Meylan et al. |
| 2007/0230338 A1 | 10/2007 | Shao et al. |
| 2008/0130660 A1 | 6/2008 | Ros-Giralt et al. |
| 2008/0267123 A1 | 10/2008 | Zeira et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0252145 A1 | 10/2009 | Meylan et al. |
| 2009/0290655 A1 | 11/2009 | Abraham et al. |
| 2009/0323646 A1 | 12/2009 | Ketchum et al. |
| 2010/0290423 A1 | 11/2010 | Hwang et al. |
| 2010/0309872 A1 | 12/2010 | Amini et al. |
| 2011/0223952 A1 | 9/2011 | Nanda et al. |
| 2012/0188973 A1 | 7/2012 | Meylan et al. |

FOREIGN PATENT DOCUMENTS

| | | |
|---|---|---|
| EP | 0475682 A2 | 3/1992 |
| EP | 0782360 A2 | 7/1997 |
| EP | 0912016 A2 | 4/1999 |
| EP | 1052855 A2 | 11/2000 |
| EP | 1089500 | 4/2001 |
| EP | 1182900 A1 | 2/2002 |
| EP | 1187406 A1 | 3/2002 |
| EP | 1261183 A1 | 11/2002 |
| EP | 1317110 A1 | 6/2003 |
| EP | 1463217 A1 | 9/2004 |
| JP | 2226828 | 10/1990 |
| JP | 2000174820 A | 6/2000 |
| JP | 2001024573 A | 1/2001 |
| JP | 2001160813 A | 6/2001 |
| JP | 2001160843 A | 6/2001 |
| JP | 2001507907 T | 6/2001 |
| JP | 2001217768 A | 8/2001 |
| JP | 2001522211 | 11/2001 |
| JP | 2003060564 A | 2/2003 |
| JP | 2003060655 A | 2/2003 |
| JP | 2003078565 | 3/2003 |
| JP | 2003143644 A | 5/2003 |
| JP | 2003163669 A | 6/2003 |
| JP | 2003249939 A | 9/2003 |
| JP | 2003258807 A | 9/2003 |
| JP | 2003528507 A | 9/2003 |
| JP | 2003289309 A | 10/2003 |
| JP | 2003289576 A | 10/2003 |
| JP | 2005020163 A | 1/2005 |
| JP | 2005505148 T | 2/2005 |
| JP | 2005057373 A | 3/2005 |
| JP | 2005094156 A | 4/2005 |
| KR | 20030036847 | 5/2003 |
| KR | 20040076979 | 9/2004 |
| KR | 20060090258 A | 8/2006 |
| KR | 20060090259 A | 8/2006 |
| TW | 550926 B | 9/2003 |
| TW | 200304292 | 9/2003 |
| TW | 567731 B | 12/2003 |
| TW | 200401549 | 1/2004 |
| WO | WO9625811 A1 | 8/1996 |
| WO | WO9905881 A1 | 2/1999 |
| WO | WO9957931 A1 | 11/1999 |
| WO | WO0052880 A2 | 9/2000 |
| WO | WO0056113 A1 | 9/2000 |
| WO | WO0064111 A1 | 10/2000 |
| WO | WO0119032 A1 | 3/2001 |
| WO | WO0128170 A2 | 4/2001 |
| WO | WO0171928 A2 | 9/2001 |
| WO | WO0172081 | 9/2001 |
| WO | 0176110 | 10/2001 |
| WO | WO0213440 A2 | 2/2002 |
| WO | WO0228119 A2 | 4/2002 |
| WO | WO0233582 A2 | 4/2002 |
| WO | WO0233852 A2 | 4/2002 |
| WO | WO0235873 A2 | 5/2002 |
| WO | WO02061969 A1 | 8/2002 |
| WO | WO02065664 A2 | 8/2002 |
| WO | WO02078211 A2 | 10/2002 |
| WO | WO02082751 A2 | 10/2002 |
| WO | WO02093843 A1 | 11/2002 |
| WO | WO02100064 A2 | 12/2002 |
| WO | WO03032526 A1 | 4/2003 |
| WO | WO03034619 A1 | 4/2003 |
| WO | WO03034642 A2 | 4/2003 |
| WO | WO03039074 A1 | 5/2003 |
| WO | WO03041297 A1 | 5/2003 |
| WO | WO03041343 A2 | 5/2003 |
| WO | WO03047176 A1 | 6/2003 |
| WO | WO03050968 A2 | 6/2003 |
| WO | WO03069857 A1 | 8/2003 |
| WO | WO03107577 A2 | 12/2003 |
| WO | 2004030287 | 4/2004 |
| WO | WO2005039127 A1 | 4/2005 |
| WO | WO2005039133 A1 | 4/2005 |

OTHER PUBLICATIONS

International Search Report—PCT/US2005/018834, International Search Authority—European Patent Office—Aug. 9, 2005.
Written Opinion—PCT/US2005/018834, International Search Authority—European Patent Office—Aug. 9, 2005.
Written Opinion of the International Preliminary Examining Authority—PCT/US2005/018834, International Preliminary Examination Authority—Alexandria, Virginia, US—Oct. 12, 2006.
International Preliminary Report on Patentability—PCT/US2005/018834, International Preliminary Examination Authority—Alexandria, Virginia, US—Jan. 31, 2007.
"TIA/EIA/IS-856 Standard" CDMA2000 High Rate Packet Data Air Interface Specification, Nov. 2000, (the IS-856 standard).
3GPP2 TS 25.211: "Physical channels and mapping of transport channels onto physical channels (FDD)", Release 6, V.6.0.0, Dec. 2003.
3GPP2 TS 25.212: "Multiplexing and channel coding (FDD)", Release 5, V.510.0, Jun. 2005.
3GPP2 TS 25.213: "Spreading and modulation (FDD)", Release 5, V5.6.0, Jun. 2005.
3GPP2 TS 25.214: "Physical layer procedures (FDD)", Release 5, V5.11.0, Jun. 2005.
3GPP: "TIA/EIA/IS-95-B Mobile Station-Base Station Compatibility Standard for Dual-Mode Wideband Spread Spectrum Cellular System", Mar. 1999.
TR-45.5 "Physical Layer Standard for cdma2000 Spread Spectrum Systems", (the IS-2000 standard), May 28, 2002.
"A Wireless Token Ring Protocol for Ad-Hoc Networks," IEEE Aerospace Conference Proceedings, 2002. vol. 3, pp. 6-1219 to 3-1228.
3GPP TS 25.211 v5.0.0 (Mar. 2002) Technical Specification Group Radio Access Network; Physical Channels and Mapping of Transport Channels onto Physical Channels (FDD) (Release 5).
3GPP TS 25.212 v6.0.0 (Dec. 2003) Technical Specification Group Radio Access Network; Multiplexing and Channel Coding (FDD) (Release 6).
3GPP TS 25.213 v6.0.0 (Dec. 2003) Technical Specification Group Radio Access Network; Spreading and Modulation (FDD) (Release 6).
3GPP TS 25.214 v6.0.0 (Dec. 2003) Technical Specification Group Radio Access Network; Physical Layer Procedures (FDD) (Release 6).
3GPP2-C.S0002-C v1.0, "Physical Layer Standard for cdma2000 Spread Spectrum Systems", (TR 45.5), Release C, May 28, 2002.
ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).
ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 5 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
ETSI TS 125 214 v6.3.0; "Universal Mobile Telecommunications System (UMTS); Physical layer procedures (FDD)", 3G TS 25.214 version 6.3.0 Release 5 (Sep. 2004).
IEEE Std. 802.11a-1999 Part 11: Wireless LAN Medium Access Control (MAC) and Physical Layer (PHY) Specifications: High-speed Physical Layer in the 5 GHz Band.
IEEE Std. 802.11b-1999 Part 11: Wireless LAN Medium Access Control (MAC) and Physical Layer (PHY) Specifications: Higher-Speed Physical Layer Extension in the 2.4 GHz Band.
IEEE Std. 802.11 e-2003 Part 11: Wireless LAN Medium Access Control (MAC) and Physical Layer (PHY) Specifications, Amendment 4: Further Higher Data Rate Extension in the 2.4 GHz Band.
IEEE Std. 802.11 g-2003 Part 11: Wireless LAN Medium Access Control (MAC) and Physical Layer (PHY) Specifications, Amendment 4: Further Higher Data Rate Extension in the 2.4 GHz Band.

Mujtaba, "TGn Sync Proposal Technical Specification," IEEE Wireless Lans, IEEE 802.11-04/0899r5, May 2005, pp. 1-134.
Seung et al., : "Multi-Stage Partial PIC Receivers for Multi-Rate DS-CDMA System with Multiple Modulation", IEEE 2003, pp. 591-594.
TIA/EIA-95-B Mobile Station-Base Station Compatibility Standard for Dual-Mode Wideband Spread Spectrum Cellular System (IS-95 Standard), Mar. 1999.
TIA/EIA/IS-856 cdma2000 High Rate Packet Data Air Interface Specification, Nov. 2000.
TIA/EIA/IS-856-A, "cdma2000 High Rate Packet Data Air Interface Specification", (Revision of TIA/EIA/IS-856), Apr. 2004.
TR-45.5 Physical Layer Standard for cdma2000 Spread Spectrum Systems, 3GPP2 C.S000-2D, Version 1.0, Feb. 13, 2004.
Won-Tae et al., : "MMAC : An Efficient WMATM MAC for Multicast Communications", Global Telecommunications Conference—Globecom '99, IEEE , pp. 587-591.
TGn Sync Complete Proposal, IEEE 802.11-04/888r13, IEEE mentor, Jul. 8, 2005.
Translation of Office Action in Japan application 2008-531288 corresponding to U.S. Appl. No. 11/312,187, citing IEEE_802_11_04_888r13_TGn_Sync_Complete_year_2005, JP2005505148, JP2000174820, JP2005020163 and WO2005039133 dated Jan. 25, 2011.
3GPP TS 25.211 Physical channels and mapping of transport channels onto physical channels (FDD). Release 5, V5.0.0, Mar. 2002.
3GPP TS 25.212 v6.0.0 (Dec. 2003) Technical Specification Group Radio Access Network;Multiplexing and Channel Coding (FDD) (Release 6).
3GPP: "TIA/EIA/MS-95-B Mobile Station-Base Station Compatibility Standard for Wideband Spread Spectrum Cellular System". Feb. 3, 1999.
ETSI TS 125 213 v6.0.0; "Universal Mobile Telecommunications System (UMTS); Spreading and modulation (FDD)", 3G TS 25.213 version 6.0.0 Release 6 (Dec. 2003).
European Search Report—EP10176962, Search Authority—Munich Patent Office, Nov. 5, 2010.
Miyashita, K. et al. "Eigenbeam Space Division Multiplexing (E-SDM) in a MIMO Channel", Technical Research Report by Electric Information Communication Academic Conference, May 17, 2002, vol. 102, No. 86, pp. 13-18, RCS2002-53.
Taiwanese Search report—095132750—TIPO—Nov. 15, 2010.
Partial European Search Report—EP10010614 Search Authority—Munich Patent Office, Feb. 1, 2011.
Cheng Chen J., "A Comparison of MAC Protocols for Wireless Local Networks Based on Battery Power Consumption", INFOCOM '98. Seventeenth Annual Joint Conference of the IEEE Computer and Communications Societies. Proceedings, IEEE, IEEE, Apr. 2, 1998, vol. 1, p. 150-157.
Edfors et al, "OFDM Channel Estimation by Singular Value Decomposition," IEEE Transactions on Communications, 46(7):931-939, (Jul. 1998).
Fang, J.C., et al., "A synchronous, reservation based medium access control protocol for multihop wireless networks", Wireless Communications and Networking, 2003, WCNC 2003. 2003 IEEE, IEEE, Mar. 20, 2003, vol. 2, p. 994-998.
Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.
Gyasi-Agyei A., et al., "GPRS-Features and Packet Random Access Channel Performance Analysis", Networks, 2000. (ICON 2000). Proceedings. IEEE International Conference on, IEEE, Dec. 31, 2000, p. 13-17.
Ivrlac M. T., et al.,"Efficient Use of Fading Correlations in MIMO Systems", Vehicular Technology Conference, 2001, VTC 2001 Fall, vol. 4, pp. 2763-2767.
John Ketchum, et al., "High-Throughput Enhancements for 802.11: Features and Performance of QUALCOMM's Proposal", IEEE802.11-04/0873r1 , IEEE mentor, Aug. 13, 2004, slide 58-66.
Kuehnel, Thomas, "Wireless Multimedia Enhancements (WME)", 11-03-0504-01-000e, IEEE mentor, Jul. 23, 2003, paragraph 3.4.3.

"MIMO-related Technology," Collection of Standard Technologies of the Japan Patent Office, May 25, 2005, 1-1-1, 1-1-3, URL, http://www.jpo.go.jp/shiryou/s_sonota/hyoujun_gijutsu/mimo/mokuji.htm.

Sheu, Shiann-Tsong et al.: "An Improved Data Flushing MAC Protocol for IEEE 802.11 Wireless Ad Hoc Network," VTC 2002-Fall. 2002 IEEE 56th Vehicular Technology Conference Proceedings. Vancouver, Canada, Sep. 24-28, 2002; [IEEE Vehicular Technolgy Conference], New York, NY: IEEE, US, vol. 4, (Sep. 24, 2002), pp. 2435-2439; XP010608871; ISBN: 978-0-7803-7467-6 the whole document.

Shou-Chih Lo, et al., "An Efficient Multipolling Mechanism for IEEE 802.11 Wireless LANs", Computers, IEEE Transactions on, IEEE, Jun. 30, 2003, vol. 52, Issue 6, p. 764-778.

Taiwan Search Report—TW094118180—TIPO—Mar. 14, 2012.

* cited by examiner

METHOD AND APPARATUS FOR SCHEDULING IN A WIRELESS NETWORK

CLAIM OF PRIORITY UNDER 35 U.S.C. §119

The present Application for Patent claims priority to Provisional Application Ser. No. 60/576,721, entitled "Method and Apparatus for Scheduling in Wireless Networks," filed Jun. 2, 2004, and assigned to the assignee hereof and hereby expressly incorporated by reference herein.

BACKGROUND

I. Field

The present invention relates generally to communication, and more specifically to techniques for scheduling transmissions in a wireless network.

II. Background

Wireless networks are widely deployed to provide various communication services such as voice, packet data, and so on. These networks may be capable of supporting communication for multiple users by sharing the available system resources. Examples of such networks include a wireless local area network (WLAN), a wireless personal area network (WPAN), a wireless wide area network (WWAN), a code division multiple access (CDMA) network, a time division multiple access (TDMA) network, a frequency division multiple access (FDMA) network, and so on. The terms "network" and "system" are often used interchangeably.

A wireless network may include any number of access points and any number of user terminals. An access point is typically a gateway or a bridge between the wireless network and a backbone, which may be a wireline network. A user terminal is a device that can communicate with an access point and/or another user terminal. Each user terminal may be actively communicating with an access point or may be idle at any given moment. The active user terminals may have different data requirements and capabilities, and the idle user terminals may likewise have different capabilities. The wireless network may implement a specific transmission structure, support one or more transmission schemes, and so on. A key challenge is then to select and schedule user terminals for transmission and to allocate the available system resources to the selected user terminals as efficiently as possible based on their requirements and capabilities. This task is more challenging in a high throughput wireless network where scheduling has greater impact on the overall performance of the wireless network.

There is therefore a need in the art for techniques to efficiently schedule transmission in a wireless network.

SUMMARY

Techniques for scheduling "flows" and "links" for transmission are described herein. Each link is for a specific source station and a specific destination station. A station may be an access point or a user terminal. Each link carries one or more flows. Each flow carries data for a higher layer in a protocol stack and may be associated with certain requirements such as throughput and delay requirements. Each flow and/or each link may further be associated with certain feedback requirements. For example, each flow may require acknowledgments (ACKs) for data sent for the flow. A serving interval is determined for each flow based on the requirements for the flow. The serving interval indicates how often the flow should be served in order to meet all of its requirements. A serving interval is then determined for each link based on the serving intervals for all of the flows sent on the link. Each link is scheduled for transmission at least once in each serving interval, if system resources are available, to ensure that the requirements for all flows sent on the link are met.

The links are also scheduled in a manner to facilitate closed loop rate control. If overhead channels are not available to send feedback information (e.g., pilot, rates, and so on), then a reverse transmission may be scheduled prior to each data transmission in order to provide the feedback information. The links are also scheduled such that ACKs for one or more layers in the protocol stack are sent at sufficiently fast rates so that data transmission is not limited or stalled waiting for the ACKs.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The scheduling techniques described herein may be used for various wireless networks such as WLAN, WPAN, and so on. These techniques may also be used for a single-input single-output (SISO) network with single-antenna transmitting and receiving stations, a single-input multiple-output (SIMO) network with single-antenna transmitting stations and multi-antenna receiving stations, a multiple-input single-output (MISO) network with multi-antenna transmitting stations and single-antenna receiving stations, a multiple-input multiple-output (MIMO) network with multi-antenna transmitting and receiving stations, or a hybrid wireless network with a combination of single-antenna and multi-antenna stations. These techniques may also be used for (1) a time division duplexed (TDD) network in which data is sent on the downlink and uplink on a single frequency band in different time intervals and (2) a frequency division duplexed (FDD) network in which data is sent on the downlink and uplink on different frequency bands. For clarity, certain aspects of the scheduling techniques are described below for a wireless TDD MIMO network.

Figure 1:
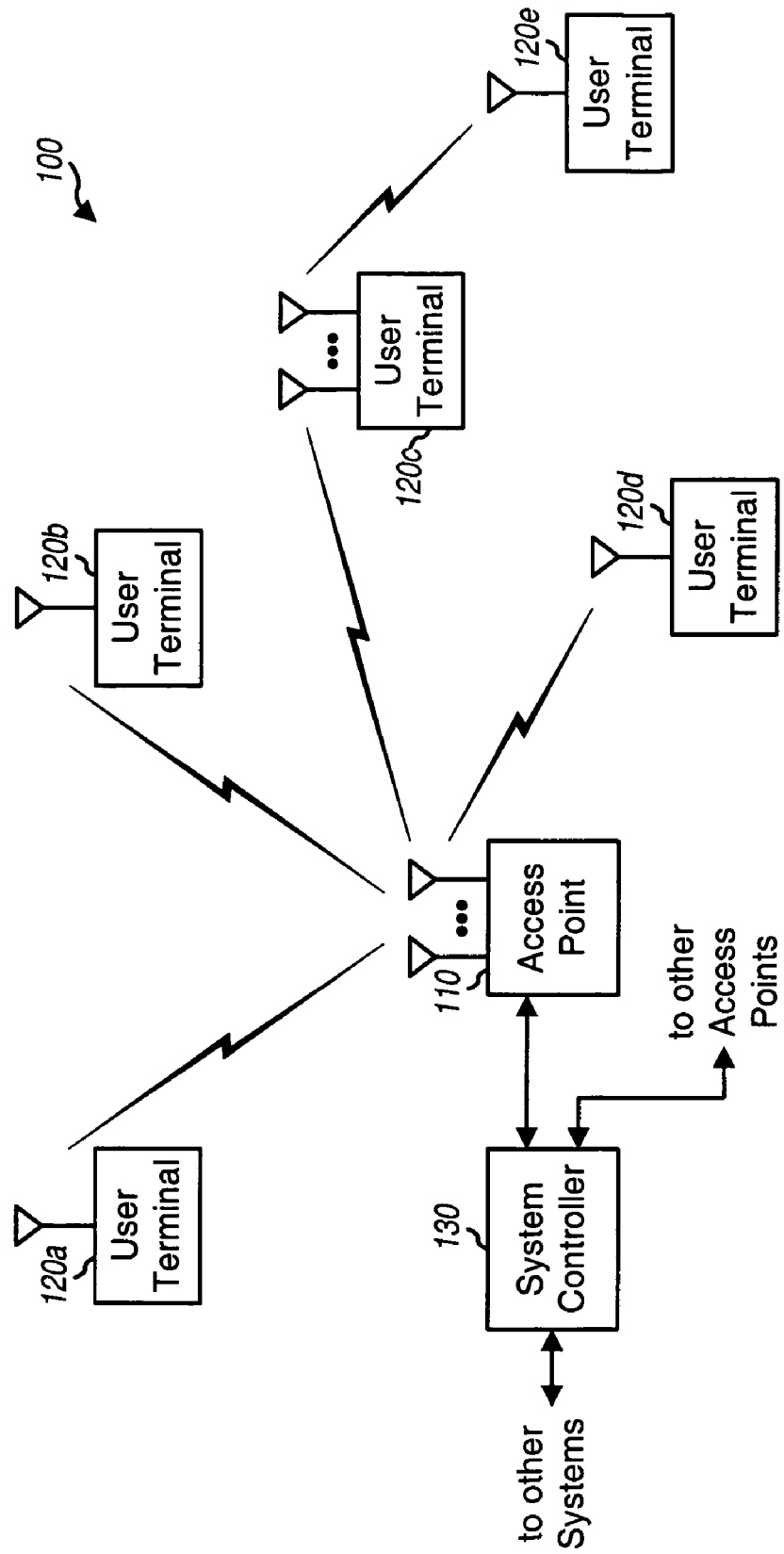
FIG. 1 shows a wireless network.

FIG. 1 shows a wireless network 100 with at least one access point 110 and multiple user terminals 120. Only one access point is shown in FIG. 1 for simplicity. An access point is generally a fixed station that communicates with the user terminals and may also be called a base station or some other terminology. A user terminal may be fixed or mobile and may also be called a mobile station, a wireless device, a user equipment (UE), or some other terminology. Each access point may support communication for any number of user terminals. Each user terminal may communicate with one or more access points. A user terminal may also communicate peer to peer with another user terminal. For a centralized network architecture, a system controller 130 couples to the access points and provides coordination and control for these access points. In the following description, a "station" can refer to an access point or a user terminal.

Figure 2:
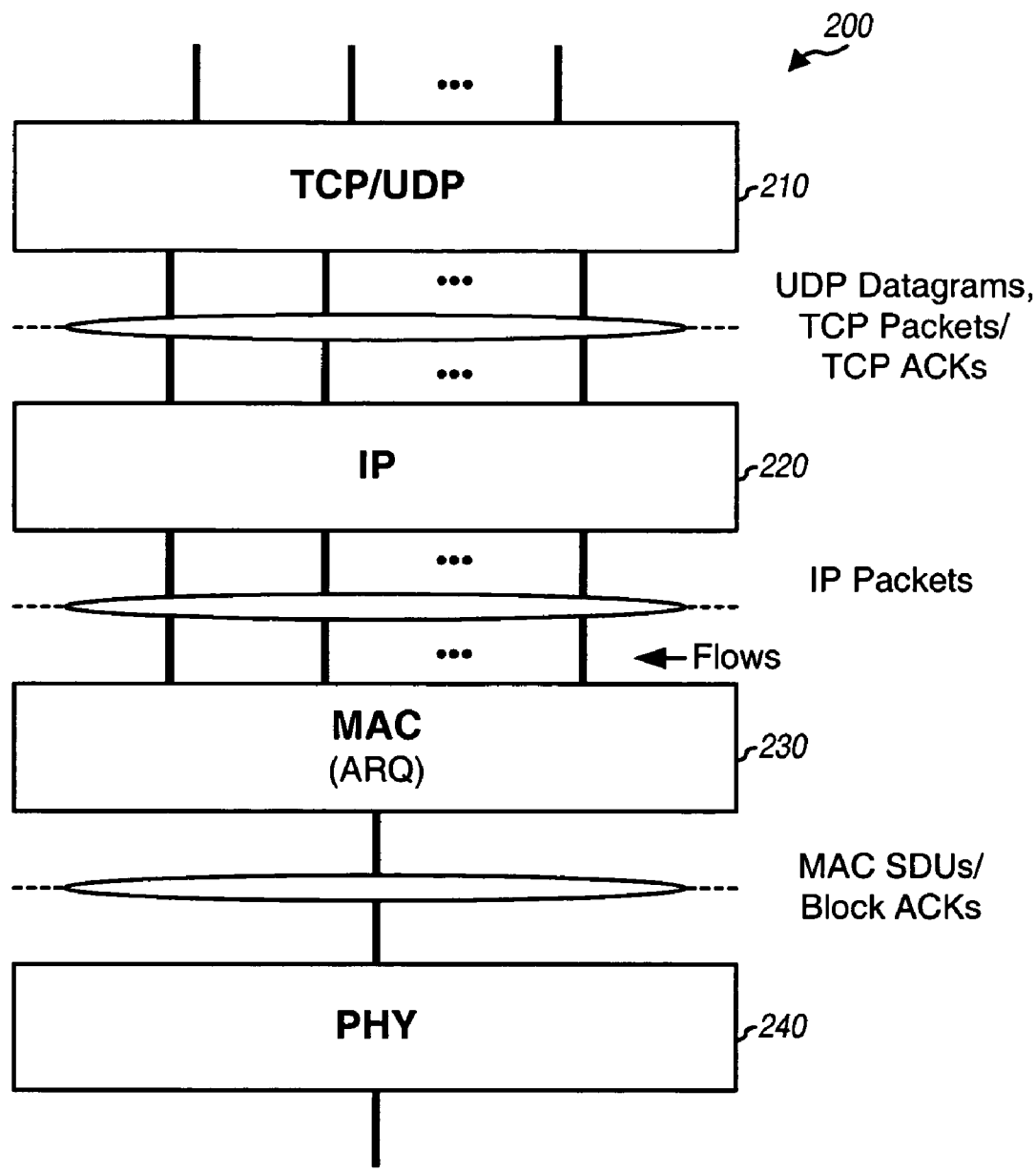
FIG. 2 shows an exemplary protocol stack.

FIG. 2 shows an exemplary protocol stack 200 that may be used for wireless network 100. Protocol stack 200 includes a Transmission Control Protocol (TCP)/User Datagram Protocol (UDP) layer 210, an Internet Protocol (IP) layer 220, a Medium Access Control (MAC) layer 230, and a physical (PHY) layer 240. Protocol stack 200 may also include other intermediary layers and/or sublayers. For example, a Point-to-Point Protocol (PPP) layer, a Radio Link Protocol (RLP) layer, and so on may reside between the IP layer and the MAC layer. TCP and UDP are two transport layer protocols. UDP provides a transport service without a reliability mechanism and is often used for real-time applications where retransmission is not necessary or less applicable. TCP provides reliable transport service and has error detection and error recovery mechanisms. The TCP/UDP layer supports higher layer applications and provides TCP packets/segments and/or UDP datagrams. The IP layer encapsulates the TCP packets and/or UDP datagrams and provides IP packets. TCP, UDP, and IP functions are well known. The MAC layer encapsulates IP packets and provides MAC service data units (SDUs). The MAC layer also performs other functions such as scheduling of transmission for the downlink and uplink, QoS arbitration, and so on. The physical layer provides a mechanism for transmitting data over the air and performs various functions such as framing, encoding, modulation, and so on.

There may not be a defined relationship between TCP packets/UDP datagrams, IP packets, and MAC SDUs. Thus, each data unit at a given layer may carry one, a partial, or multiple data units at another layer. However, for simplicity, the following description assumes that there is a one-to-one correspondence between TCP packets/UDP datagrams, IP packets, and MAC SDUs. For clarity, the processing by the TCP/UDP, IP, and physical layers is not described below unless pertinent to the present disclosure. The MAC layer receives flows of packets from higher layers. Each flow may be associated with certain quality of service (QoS) requirements, which may be defined by a specific minimum rate and/or a specific maximum delay. The terms "rate" and "data rate" are synonymous in the following description.

Wireless network 100 may utilize an automatic retransmission request (ARQ) scheme at the MAC layer. For the ARQ scheme, a source station transmits each MAC SDU to a destination station one or multiple times until the destination station decodes the MAC SDU correctly or the maximum number of transmissions for the MAC SDU has been reached. The destination station sends back an acknowledgment (ACK) for each MAC SDU decoded correctly. Wireless network 100 may support a block ACK mechanism that allows the source station to transmit a burst of MAC SDUs before requesting for the status of these MAC SDUs with a Block Ack Request, which is a MAC message. The destination station would then send back a Block Ack, which is another MAC message, to communicate the status of all of the MAC SDUs that have been received since the last Block Ack Request. The ARQ scheme also utilizes an ARQ window that specifies the maximum number of MAC SDUs that may be sent without receiving ACKs for these MAC SDUs.

TCP supports different ACK schemes, e.g., selective ACK and TCP Reno. Each ACK scheme sends ACKs for TCP packets in a different manner, and the size of the ACK feedback for TCP is dependent on the ACK scheme selected for use. TCP also utilizes a TCP window that specifies the maximum number of TCP packets that may be sent without receiving ACKs for these packets. TCP prohibits transmission of TCP packets outside of the TCP window. Furthermore, the TCP window may shrink due to inadequate ACK feedback for transmitted TCP packets.

For clarity, in the following description, TCP ACKs refer to ACKs for TCP packets, and block ACKs refers to ACKs for MAC SDUs. Each block ACK is sent in one Block Ack and conveys the status of up to $N_{SDU}$ MAC SDUs, where $N_{SDU}$ may be equal to 64 or some other value. The ARQ window for the MAC layer is denoted as $W_{ARQ}$, and the TCP window for TCP is denoted as $W_{TCP}$.

Figure 3:
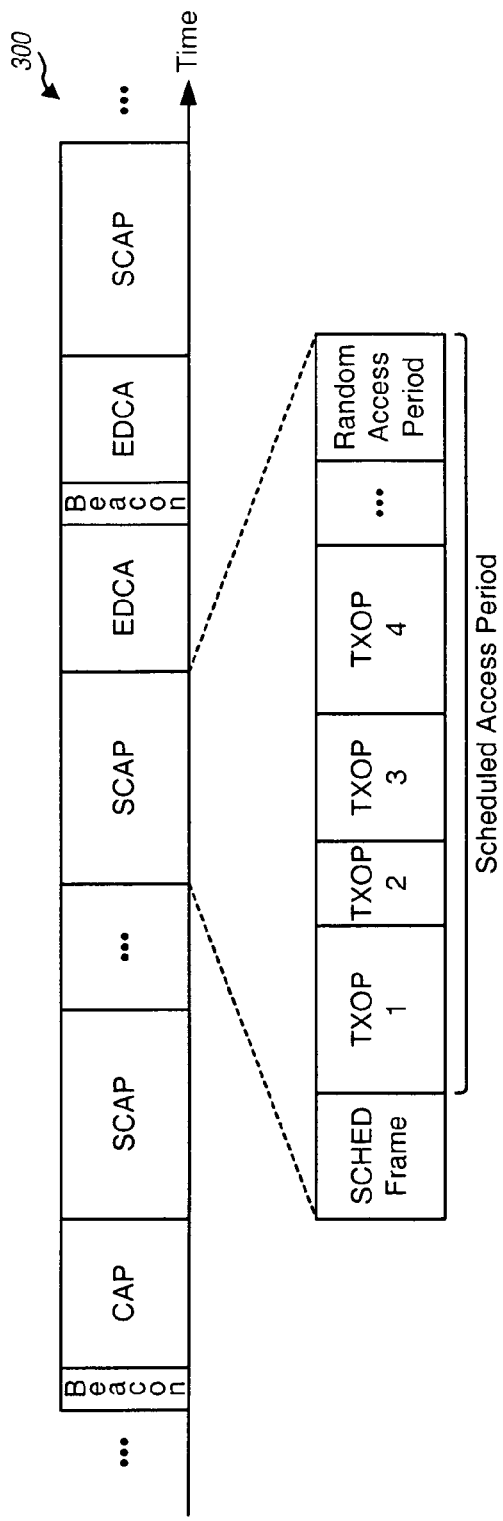
FIG. 3 shows an exemplary transmission structure.

FIG. 3 shows an exemplary transmission structure 300 that may be used for wireless network 100. Each access point in the wireless network maintains a separate timeline for all transmissions covered by that access point. The transmission timeline for one access point is described below. This access point periodically transmits a beacon on the downlink. This beacon carries a preamble and an access point identifier (AP ID), which are used by the user terminals to detect and identify the access point. The target beacon transmit time (TBTT) refers to the time interval between the start of two consecutive beacons. The TBTT may be fixed or variable depending on the manner in which the network is operated.

The time interval between the beacons may include any combination of controlled access periods (CAPs), scheduled access periods (SCAPs), and contention period (CP) where enhanced distributed channel access (EDCA) is used. The CAPs, SCAPs, and CPs may be sent in any order. Each CAP covers a period of time used by the access point for network management. Each SCAP covers a period of time in which transmissions on the downlink and uplink are scheduled. Each CP covers a period of time in which transmissions are not scheduled. The beacon, CAPs, and SCAPs represent a contention free period in which only one station (which may be the access point or a user terminal) transmits on the wireless channel at any given moment. The CPs represent contention periods in which more than one station may transmit simultaneously on the wireless channel.

Each SCAP includes a SCHED frame and a scheduled access period. Each SCAP may span a fixed or variable time duration. The SCHED frame carries a schedule of all transmission opportunities (TXOPs) for the accompanying scheduled access period. Each TXOP is a scheduled transmission from a specific source (transmitting) station to a specific destination (receiving) station. The scheduling information for each TXOP conveys the source and destination stations, the start time and duration of the TXOP, and possibly other pertinent information. A scheduled access period may include any number of TXOPs (up to a certain limit), and each TXOP may be for any pair of source and destination stations. The SCHED frame may include a pilot that may be used by the user terminals to perform channel estimation and rate control for the uplink. The scheduled access period may also include other types of transmission.

In an embodiment, the transmission timeline is divided into MAC frames, or simply, "frames". Each frame has a predetermined time duration, e.g., approximately 2 milliseconds (ms). In an embodiment, each SCAP spans one frame.

FIG. 3 shows an exemplary transmission structure. In general, the scheduling techniques described herein may be used with any transmission structure having periods whereby transmissions are scheduled.

Wireless network 100 may employ a rate control mechanism whereby a receiving station sends back channel state information (CSI) to a transmitting station to allow the transmitting station to select an appropriate transmission mode and one or more rates to use for data transmission to the receiving station. This CSI may be in the form of a steered or unsteered MIMO pilot (described below), SNR estimates, initial rates selected by the receiving station, and so on. In an embodiment, wireless network 100 does not utilize overhead channels dedicated for transmission of CSI. Hence, each station transmits CSI when allocated TXOPs.

A scheduler schedules transmission on the downlink and uplink to achieve high throughput and robust performance. The scheduler may be co-located at an access point or may reside at some other network entity (e.g., system controller 130 in FIG. 1). The scheduler may be responsible for the following tasks:

Allocate TXOPs to stations as efficiently as possible to ensure that the QoS (e.g., throughput and delay) requirements of the flows are satisfied;

Allocate TXOPs as appropriate to ensure that the rate control mechanism is updated at a sufficient rate for good performance; and Allocate TXOPs for transmission of higher layer ACKs and MAC ACKs so that data transmission is not limited or stalled by ACK feedback.

TXOPs are also allocated in a manner to accommodate the block ACK mechanism used by the ARQ scheme. The operation of the scheduler to accomplish the three tasks is described below. The following description assumes that the scheduler has access to the information available at the access point in performing the scheduling.

The following terms are used in the following description. A link is an oriented source-destination pair (A, B), with a specific source station A and a specific destination station B. The link for source-destination pair (A, B) is also referred to as link (A, B). For a data transmission from station A to station B, link (A, B) is the direction of traffic data, and link (B, A) is the direction of block ACKs for the MAC layer and TCP ACKs for TCP. Thus, two links for opposite directions are used for the data transmission from station A to station B. If station B has traffic data to send to station A, then another link for source-destination pair (B, A) is registered with the scheduler to carry the traffic data from station B to station A.

A flow is a higher layer (e.g., TCP or UDP) data stream that is sent via a link. A link may carry one or multiple flows for the same source-destination pair. If a higher layer protocol requires a bi-directional flow, then two flows on opposite links are registered with the scheduler. For example, TCP utilizes a bi-directional flow, one flow for TCP packets and another flow for TCP ACKs. The scheduler may treat the two flows for TCP packets and TCP ACKs as separate flows in the scheduling.

A call control entity that resides above the MAC layer implements an admission control algorithm and determines which flows to admit for service. The call control entity may also implement mechanisms for regulating flows, e.g., regulate the rate supported for each flow. Various designs may be used for the admission control algorithm and regulating mechanisms, as is known in the art.

The scheduler schedules links with TXOPs such that the QoS requirements (if any) for the flows sent on these links are satisfied. The scheduler may dynamically allocate time to the links based on the following attributes of each flow:

Delay requirements of the flow;
Throughput requirements of the flow; and
Transmission duration requested in real time by a source station.

Details of the scheduling are described below. Much of the description below is for a bi-directional flow for TCP, which is more complicated in terms of scheduling than a single flow for UDP. The scheduler conveys the scheduled TXOPs to the source and destination stations via the SCHED frames.

1. Serving Interval

In an embodiment, each link is associated with a serving interval that indicates how often that link should be scheduled with a TXOP. The scheduler attempts to schedule each link with at least one TXOP in each serving interval for that link. The serving interval for each link may be determined based on various criteria such as, for example, the delay requirements of the flow(s) sent on the link, the throughput requirements of the flow(s), the ARQ scheme selected for use, the rate control mechanism, and so on, or a combination thereof. The computation of the serving interval for an exemplary link (A, B) is described below. Table 1 shows a list of variables used for an exemplary flow F.

TABLE 1

| Symbol | Description |
| --- | --- |
| $d_{flow}$ | The delay requirement for flow F, in units of seconds. |
| $R_{flow}$ | The rate requirement for flow F, in units of bits/second (bps). |
| $S_{flow}$ | The MAC SDU payload size for flow F, in units of bits/MAC SDU. |
| $W_{ARQ}$ | The ARQ window size applicable to flow F, in number of MAC SDUs. |
| $W_{TCP}$ | The TCP window size applicable to flow F, in number of TCP packets. |
| $\alpha$ | The fraction of the ARQ window covered by a block ACK sent in each serving interval. |
| $N_{max}$ | The maximum number of transmissions for a MAC SDU by the ARQ scheme. |
| $T_{ARQ}$ | The time interval for sending block ACKs for flow F. |
| $T_{delay}$ | The time interval between retransmissions of a MAC SDU by the ARQ scheme. |
| $T_{flow}$ | The serving interval for flow F. |

The serving interval for flow F is selected to achieve both the throughput and delay requirements for the flow. The throughput requirement for flow F may be achieved, in part, by ensuring that block ACKs for the flow are sent at a sufficiently fast rate so that the flow is not stalled waiting for these ACKs. In general, more MAC SDUs are sent for a higher rate, and block ACKs are sent more frequently. The delay requirement for flow F may be met, in part, by ensuring that each MAC SDU may be sent up to $N_{tx}$ times within the delay $d_{flow}$ specified for the flow, where $N_{tx} \leq N_{max}$.

Destination station B sends a block ACK whenever it receives a Block Ack Request and is assigned a TXOP. The number of MAC SDUs covered by the block ACK may be given as $\alpha \cdot W_{ARQ}$, which is a fraction of the ARQ window. Station B is scheduled with TXOPs for block ACK transmission at a sufficiently fast rate so that station A is not stalled waiting for the block ACKs. In an embodiment, the time interval $T_{ARQ}$ for sending block ACKs for flow F is computed as:

$$T_{ARQ} = \frac{\alpha \cdot W_{ARQ} \cdot S_{flow}}{R_{flow}}. \quad \text{Eq (1)}$$

As shown in equation (1), the block ACK interval is set equal to the time duration needed to transmit a certain fraction of the ARQ window, which is $\alpha \cdot W_{ARQ}$ MAC SDUs. This time duration is equal to $\alpha \cdot W_{ARQ}$ MAC SDUs times the MAC SDU payload size ($S_{flow}$) and further divided by the rate for the flow ($R_{flow}$). $R_{flow}$ is the rate that the scheduler either guarantees or attempts to achieve for the flow and is not the instantaneous rate used for each TXOP scheduled for the flow. Equation (1) assumes that the MAC SDU payload size is fixed for flow F. In general, a fixed or variable MAC SDU payload size may be used for flow F. Equation (1) may then be modified so that $T_{ARQ}$ represents the expected amount of time to send $\alpha \cdot W_{ARQ}$ MAC SDUs. The block ACK interval is selected in equation (1) such that transmitting a block ACK for $\alpha$ fraction of the ARQ window at each service interval allows the flow to meet its rate requirement. A smaller fraction $\alpha$ corresponds to a shorter block ACK interval, which corresponds to a smaller probability of the flow being limited by the block ACK feedback. In an embodiment, the fraction is selected as $\alpha=\frac{1}{4}$ so that a block ACK is sent for a quarter of the MAC SDUs in the ARQ window. The block ACKs may also be sent more or less frequently.

In an embodiment, the retransmission delay $T_{delay}$ for flow F is computed as:

$$T_{delay} = \frac{d_{flow}}{N_{tx}+1}. \quad \text{Eq (2)}$$

The retransmission delay is chosen to ensure that $N_{tx}$ ARQ rounds can be completed within the delay requirement of the flow. Each ARQ round covers one transmission of a given MAC SDU. The factor of plus one (+1) in the denominator in equation (2) accounts for the MAC ACK feedback for the $N_{tx}$-th transmission of the MAC SDU.

In an embodiment, the serving interval $T_{flow}$ for flow F is selected as:

$$T_{flow} = \min(T_{ARQ}, T_{delay}). \quad \text{Eq (3)}$$

As shown in equation (3), the serving interval for flow F is determined to be the smaller of the block ACK interval and the retransmission delay. This ensures that the serving interval will meet both the delay requirement of the flow and the feedback requirement for the ARQ scheme, which may ensure that the rate requirement for the flow can be achieved. The serving interval is typically dominated by the block ACK interval for a high rate flow and by the retransmission delay for a delay sensitive flow.

A specific embodiment for determining the serving interval for a flow has been described above. The serving interval for each flow may also be determined in other manners and/or using other criteria. For example, the serving interval for a flow may be selected to achieve a required packet error rate (PER) for the flow. The value $N_{tx}$ for the flow may be chosen based on the PER and the delay requirements for the flow. The PER achieved by the ARQ scheme for the flow is determined by (1) the number of transmissions for each MAC SDU for the flow and (2) the PER achieved by the physical layer for each transmission of the MAC SDU. $N_{tx}$ may be selected such that the achieved PER for the flow is less than or equal to the required PER for the flow. A lower PER may be achieved with more transmissions (i.e., a larger $N_{tx}$), which corresponds to a shorter retransmission delay, which in turn corresponds to a shorter serving interval for the flow. The serving interval for each flow may also be selected by taking into account user priority, data requirements, other QoS requirements, and so on.

As noted above, multiple flows may be sent on a link. In this case, a serving interval may be determined for each flow, e.g., as described above. The serving interval for the link may then be set equal to the shortest serving interval for all of the flows sent on the link. Each link is then scheduled based on its serving interval.

A bi-directional flow may be used for a data transmission, in which case two flows on opposite links are registered with the scheduler. A serving interval may be selected for each link to meet the requirements of the data transmission. As an example, for a TCP transmission, a first flow may be registered for a first link to carry TCP packets, and a second flow may be registered for a second link in the opposite direction to carry TCP ACKs. The serving interval for the first link carrying the TCP data flow may be determined as described above based on the rate, packet size, and delay requirements (if any) for the TCP transmission. However, the rate for the TCP ACK flow may not be known since it depends on which TCP ACK scheme is selected for use. Furthermore, the TCP ACK flow may not have a specific delay requirement, or the delay requirement for the TCP ACK flow may be dependent on the TCP data flow.

The serving interval for the TCP ACK flow may be determined as described below. In the following description, $N_{data/ACK}$ is the number of TXOPs scheduled for the TCP data flow between two consecutive TXOPs scheduled for the TCP ACK flow, where $N_{data/ACK} \geq 1$. The serving interval for the TCP ACK flow is thus $N_{data/ACK}$ times the serving interval for the TCP data flow. For simplicity, the following description assumes that TCP packets are not fragmented, so that each TCP packet is sent in one MAC SDU. Also for simplicity, the additional delays due to retransmissions by the ARQ scheme are not considered.

Each time the TCP data flow is scheduled, $\alpha \cdot W_{ARQ}$ MAC SDUs (or TCP packets) may be sent for that flow. The number of TCP packets sent during the serving interval for the link for the TCP ACK flow may then be expressed as: $\alpha \cdot W_{ARQ} \cdot N_{data/ACK}$. To ensure that TCP ACKs reach the TCP sender before the TCP sender's TCP window is exhausted, the number of TCP packets sent during the TCP ACK serving interval is limited as follows: $\alpha \cdot W_{ARQ} \cdot N_{data/ACK} < W_{TCP}$. The TCP sender is not limited (e.g., not idle waiting for TCP ACKs) if the following constraint is satisfied:

$$N_{data/ACK} < \frac{W_{TCP}}{\alpha \cdot W_{ARQ}}. \quad \text{Eq (4)}$$

Equation (4) assumes that one TCP packet is sent in each MAC SDU. Equation (4) may be modified to account for fragmentation of TCP packets.

The serving interval for the TCP ACK flow may then be expressed as:

$$T_{ACK} = N_{data/ACK} \cdot T_{data}, \quad \text{Eq (5)}$$

where $T_{data}$ is the serving interval for the TCP data flow, which may be computed as described above for equations (1) through (3); and
$T_{ACK}$ is the serving interval for the TCP ACK flow.
The serving interval for the TCP ACK flow is selected such that the TCP sender's TCP window is not exhausted.

The description above suggests that the TCP ACK flow may be treated as a data flow having a rate of $1/N_{data/ACK}$ times the rate of the TCP data flow. The computation of $T_{ARQ}$ for the TCP ACK flow ensures that the serving interval for this flow will not be greater than $N_{data/ACK}$ times the serving interval for the TCP data flow. The MAC layer can treat the TCP data flow and the TCP ACK flow as two separate data flows being sent in opposite directions. The only difference between the TCP data flow and the TCP ACK flow is the frequency at which the two flows are scheduled, which is determined by their respective serving intervals.

Figures 4, 6:
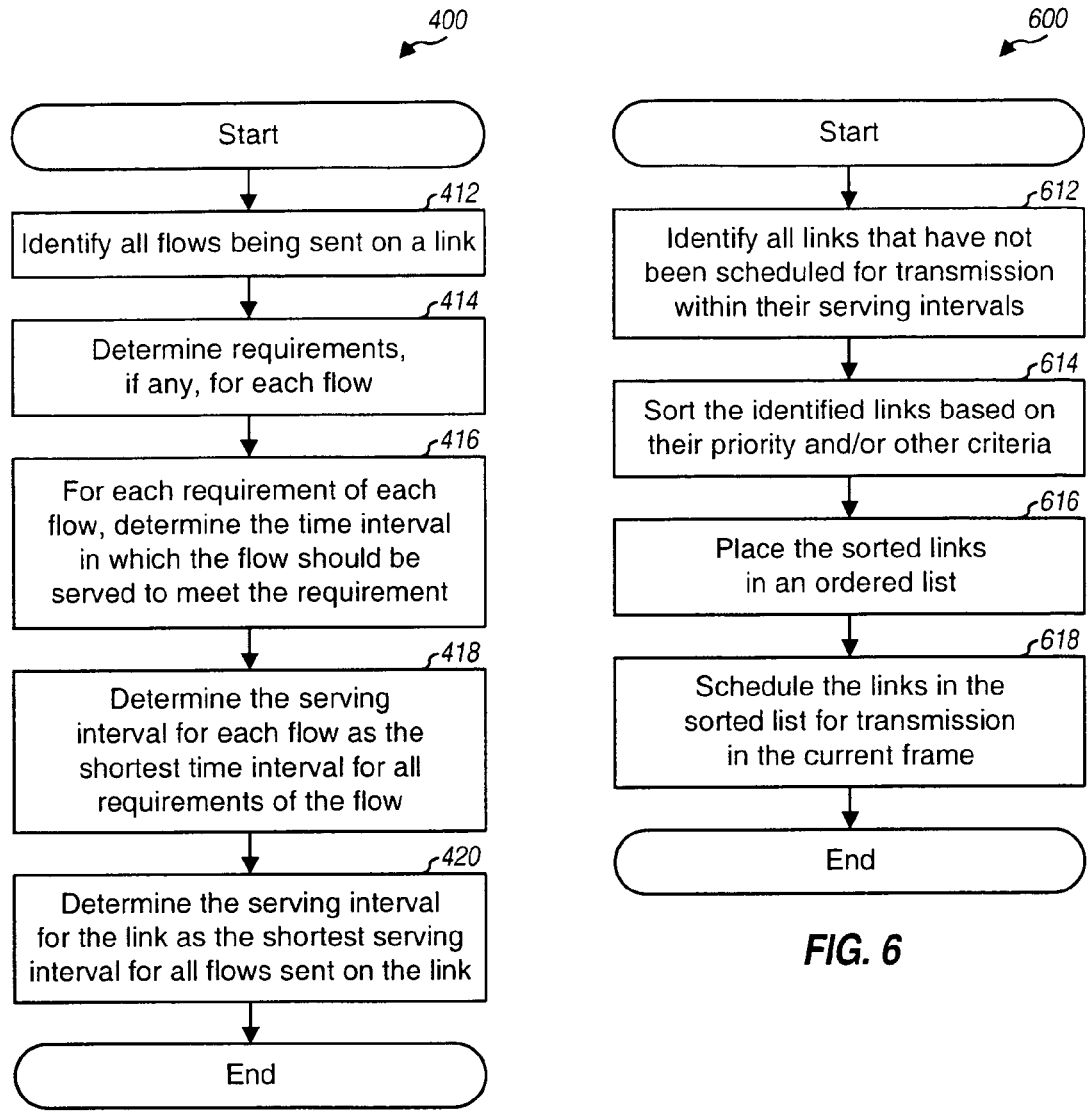
FIG. 4 shows a process for determining a serving interval for a link.
FIG. 6 shows a process for selecting and scheduling links for transmission.

FIG. 4 shows a process 400 for determining a serving interval for a given link. Initially, all flows being sent on the link are identified (block 412). The requirements, if any, for each flow are determined (block 414). These requirements may include throughput, delay, feedback, and/or other requirements. For each requirement of each flow, the time interval in which the flow should be served to meet that requirement is determined (block 416). For example, the block ACK interval and the retransmission interval may be determined for each flow, as described above. The serving interval for each flow is then determined, e.g., as the shortest time interval for all requirements of that flow, which ensures that all requirements can be met (block 418). The serving interval for the link is then determined, e.g., as the shortest time interval for all flows sent on the link, which ensures that the requirements for all flows can be met (block 420).

2. Closed-Loop Rate Control

The serving interval for each link determines how frequently or often the link should be scheduled. The scheduler attempts to allocate at least one TXOP to each link in each service interval for that link. The scheduler may also allocate TXOPs to links in a manner to facilitate efficient operation by the physical layer.

For a data transmission from station A to station B, the sender station A typically needs up-to-date channel state information (CSI) for the destination station B in order to achieve high throughput. This CSI may be in the form of a channel response estimate for the wireless channel from station A to station B, the rate(s) to use for transmission, and so on. Station A may obtain the CSI for station B based on a reverse transmission sent by station B to station A. For a TDD system, this reverse transmission may include (1) a pilot that allows station A to estimate the response of the wireless channel from station A to station B, and (2) the rate(s) to use for transmission to station B.

The scheduler may schedule a TXOP for a reverse transmission from station B to station A followed by a TXOP for a data transmission from station A to station B. The TXOP for link (B, A) may be selected to be long enough to allow station B to transmit a block ACK. Transmission of the block ACK on link (B, A) before each TXOP for link (A, B) enables efficient operation of the ARQ scheme. Station B would transmit a block ACK (if present) to station A in the scheduled TXOP for link (B, A). Otherwise, station B may transmit a Null MAC SDU (or a null packet), which is a MAC SDU with either no payload or dummy data for the payload. Station B may also transmit a pilot in the reverse transmission to allow station A to estimate the channel response between stations A and B. The reverse transmission may also carry one or more rates selected by station B in a data rate vector feedback (DRVF) field. The reverse transmission from station B allows station A to update its channel response estimate for station B (based on the pilot) and to obtain the rate(s) selected by station B (from the DRVF field).

Figure 5:
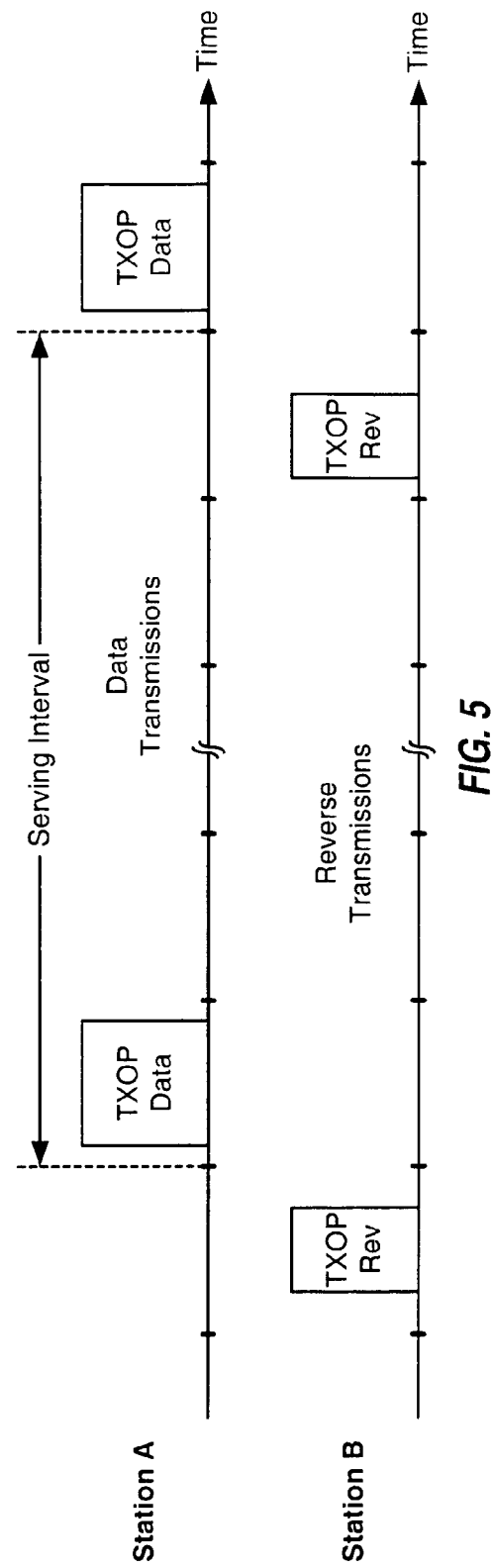
FIG. 5 shows data and reverse transmissions between station A and station B.

FIG. 5 shows data and reverse transmissions by stations A and B for a data transmission from station A to station B. This data transmission may be for TCP data, TCP ACKs, UDP data, or some other type of data. The scheduler may schedule a reverse transmission on link (B, A) prior to each data transmission on link (A, B) in order to improve system performance. Station B may send a pilot and a block ACK (if any) on the reverse transmission. The reverse transmission on link (B, A) may be scheduled at least one frame before the data transmission on link (A, B). Scheduling the reverse transmission and the data transmission in different frames provides station A with sufficient time to perform all of the required processing, e.g., to estimate the channel response based on the pilot, compute steering vectors used for spatial processing, and so on. Scheduling the reverse and data transmissions in different frames may also simplify the scheduler. FIG. 5 also shows station A being scheduled with one TXOP in each serving interval.

3. Scheduling

The scheduler performs scheduling in each scheduling interval to select and schedule links for transmission. The scheduling interval may be any time duration. In an embodiment, scheduling is performed in each frame to schedule links for transmission in the same frame. In an embodiment, links carrying data for higher layers are registered with the scheduler, and links carrying block ACKs are scheduled based on the registered links. Table 2 lists variables maintained for each link that has registered with the scheduler.

TABLE 2

| Parameter | Description |
| --- | --- |
| Serving interval | The time interval in which the link should be scheduled with a TXOP. |
| Last served time | The frame in which the link was last scheduled with a TXOP. |
| Status flag | Indicates type of transmission, if any, to be scheduled for the link. |

The last served time for each link may be initialized to the frame in which the link registered with the scheduler. The status flag for each link may be initialized to "None" when the link registered with the scheduler.

FIG. 6 shows a process 600 for selecting and scheduling links for transmission. The scheduler performs process 600 in each frame. Initially, the scheduler identifies all links that have not been scheduled for transmission at their serving intervals (block 612). This may be achieved by (1) identifying all links with their status flags set to "None" and (2) selecting each link for which the upcoming frame n+1 minus the last served time for the link is equal to or greater than the serving interval for the link. As noted above, the scheduler precedes each data transmission with a reverse transmission or channel probe. Thus, the scheduler determines if each link is due for data transmission in the next frame n+1 so that it can schedule a reverse transmission in the current frame n. The scheduler sets the status flag for each such link to "Reverse" to indicate that a reverse transmission is to be scheduled for the link. The scheduler also identifies (1) links that have not been adequately served in the prior frame n−1 and (2) links that are to be served in the current frame n, such as those with reverse transmission in the previous frame n−1.

The scheduler then sorts the identified links based on their priority and/or other criteria (block 614). The scheduler may assign higher priority to links carrying real-time flows and lower priority to links carrying best effort flows. The scheduler may also assign higher priority to links with higher ARQ rounds and lower priority to links carrying the first transmission of MAC SDUs. In general, the scheduler may prioritize the identified links based on the types of flows sent on the links, QoS classes, actual or potential delays experienced by the flows, pricing considerations, priority of the stations, and so on. The scheduler places the sorted links in an ordered list, with the highest priority link at the top of the list and the lowest priority link at the bottom of the list (block 616). The scheduler then serves as many links as possible within the sorted list for transmission in the current frame (block 618).

Figure 7:
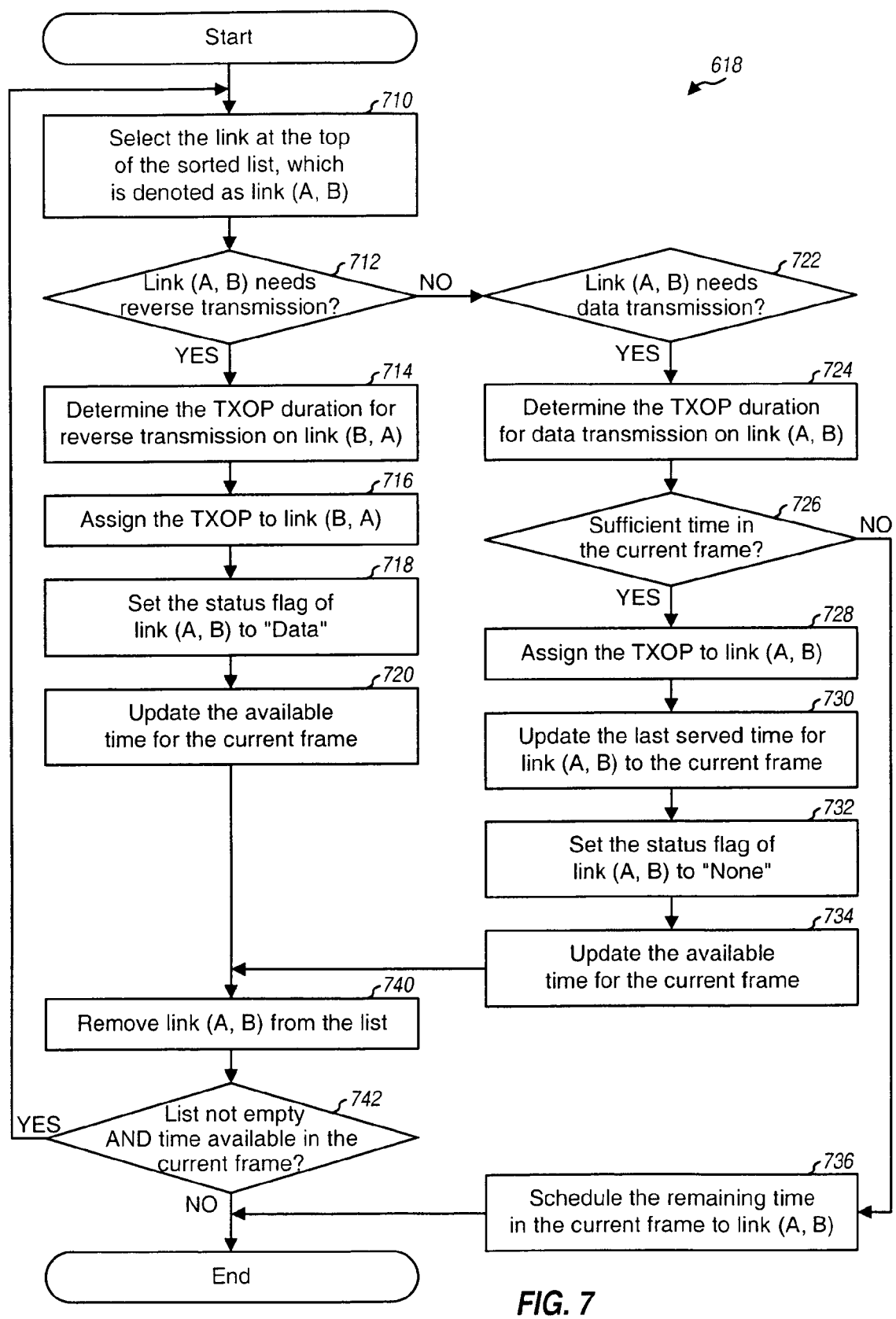
FIG. 7 shows a process for scheduling links in each frame.

FIG. 7 shows an embodiment of block 618 in FIG. 6 for scheduling links for transmission. The scheduler selects the link at the top of the sorted list, which is denoted link (A, B) (block 710). The scheduler then determines whether link (A, B) needs to be scheduled for a reverse transmission based on the status flag of the link (block 712). If the status flag for link (A, B) is set to "Reverse" and the answer is 'Yes' for block 712, then the scheduler determines the amount of time (or duration) of a TXOP for the reverse transmission, as described below (block 714) and assigns this TXOP to link (B, A) (block 716). The TXOP is of sufficient duration to allow station B to send the appropriate channel state information and possibly a block ACK to station A. The scheduler then sets the status flag of link (A, B) to "Data" to indicate that a data transmission is to be scheduled for this link in the next frame (block 718). The scheduler also subtracts the TXOP duration for link (B, A) from the time available for transmission in the current frame (block 720) and then proceeds to block 740.

In block 712, if the currently selected link (A, B) does not need a reverse transmission, then the scheduler determines whether link (A, B) needs to be scheduled for a data transmission based on the status flag of the link (block 722). If the status flag of link (A, B) is set to "Data" (by the scheduler in the prior frame n−1) and the answer is 'Yes' for block 722, then the scheduler determines the duration of a TXOP for link (A, B), as described below (block 724). The scheduler then determines whether there is sufficient time in the current frame for the TXOP for link (A, B) (block 726). If the answer is 'Yes', then the scheduler assigns the TXOP to link (A, B) (block 728) and updates the last served time for link (A, B) to the current frame (block 730). The scheduler also sets the status flag of link (A, B) to "None" to indicate that no transmission needs to be scheduled for this link unless triggered by its serving interval (block 732). The scheduler also subtracts the TXOP duration for link (A, B) from the time available for transmission in the current frame (block 734) and then proceeds to block 740.

In block 726, if the time available in the current frame is less than the TXOP for link (A, B), then the scheduler allocates the remaining time in the current frame to the TXOP for link (A, B) (block 736). The scheduler does not update the last served time or the status flag of link (A, B) since this link was not completely served and will be selected again in the next frame. The scheduler then terminates the scheduling for the current frame since there is no more time left to allocate to any other link.

In block 740, the scheduler removes link (A, B) from the sorted list. If the sorted list is not empty and if there is time available in the current frame, as determined in block 742, then the scheduler returns to block 710 to schedule a TXOP for the next link in the sorted list. Otherwise, if all links in the sorted list have been scheduled or if there is no more time left in the current frame, then the scheduler terminates the scheduling.

For simplicity, FIGS. 6 and 7 show the scheduler selecting each link to schedule a TXOP when the serving interval for the link comes up. The scheduler may also include other links for which the serving interval is close to expire in the sorted list so that these links may be scheduled prior to the expiration of their serving intervals if time is available in the current frame.

Figure 8:
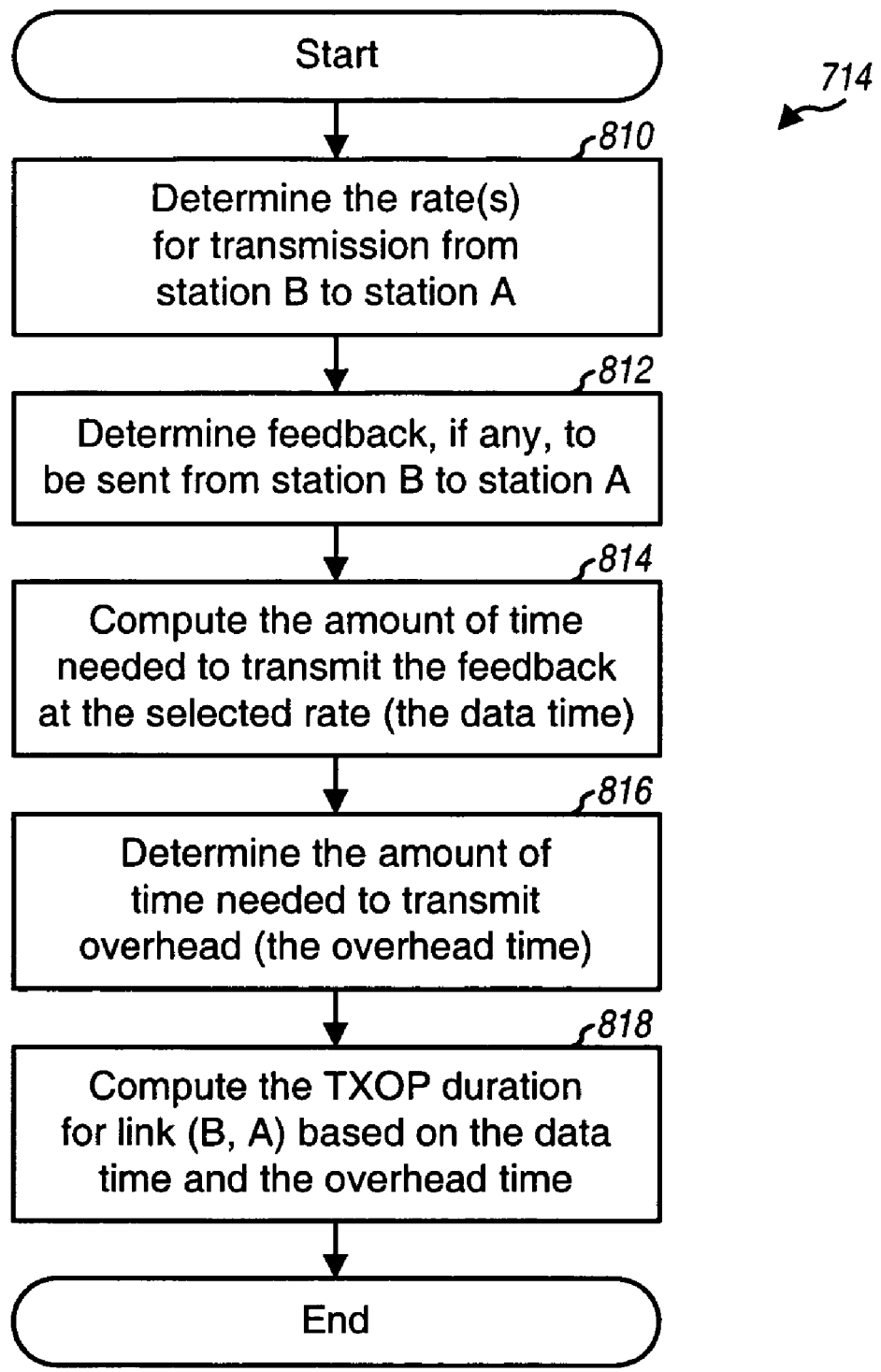
FIG. 8 shows a process for determining TXOP duration for a reverse transmission.

FIG. 8 shows an embodiment of block 714 in FIG. 7 for determining the duration of the TXOP for the reverse transmission on link (B, A) from station B to station A. The scheduler initially determines the rate(s) for transmission from station B to station A, as described below (block 810). The scheduler then determines the feedback, if any, to be sent from station B to station A (block 812). This feedback may include a pilot, a block ACK, a rate feedback (DRVF), a request for additional time, some other types of feedback, or any combination thereof. The scheduler computes the amount of time needed to transmit the feedback at the determined rate(s), which is called the "data time" (block 814). This data time includes the time needed to send header data (if any) in the MAC SDU payload. Such header data may include all or a portion of a physical layer convergence protocol (PLCP) header defined by IEEE 802.11a.

The scheduler also determines the amount of time needed to transmit overhead for the reverse transmission, which is called the "overhead time" (block 816). The overhead may include a preamble, a PLCP header, a MIMO pilot, and so on, or any combination thereof. The preamble is a certain type of pilot used for signal detection and possibly other purposes. The MIMO pilot is described below and may be considered as part of the feedback in block 814 or part of the overhead in block 816. The overhead may be dependent on whether station B is an access point or a user terminal, the number of antennas at station B, and possibly other factors. For example, the access point may already transmit a preamble at the beginning of each SCAP, in which case the overhead may contain just a PLCP header and a MIMO pilot. The duration of the overhead is also dependent on system design. As a specific example, if station B is an access point, then the overhead may include two OFDM symbols for a PLCP header and four OFDM symbols for a MIMO pilot, where each OFDM symbol may have a duration of 4 μsec. If station B is a user terminal, then the overhead may include four OFDM symbols for a preamble, two OFDM symbols for a PLCP header, and four OFDM symbols for a MIMO pilot. The scheduler then computes the TXOP duration for link (B, A) as the sum of the data time and the overhead time (block 818). The scheduler assigns link (B, A) with this TXOP duration in block 716 in FIG. 7.

Figure 9:
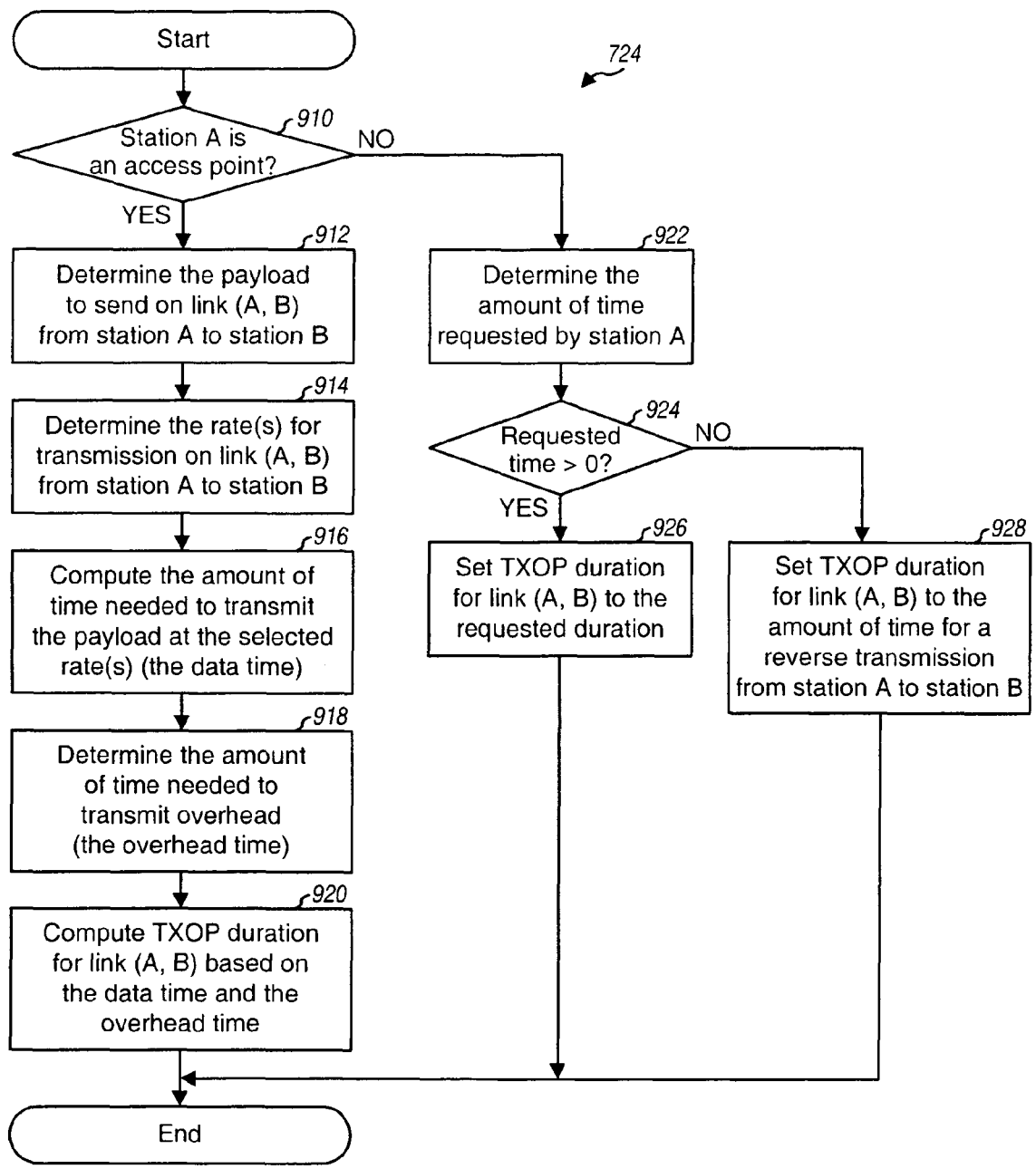
FIG. 9 shows a process for determining TXOP duration for a data transmission.

FIG. 9 shows an embodiment of block 724 in FIG. 7 for determining the duration of the TXOP for the data transmission on link (A, B) from station A to station B. As noted above, the scheduler resides at an access point or a network entity having access to pertinent information at the access point. Different types of information may be available to the scheduler depending on whether the access point is source station A or destination station B. The computation of the TXOP duration may be different with different types of information available to the scheduler, as described below.

If the source station A is an access point, as determined in block 910, then the scheduler has information available at the source station A. This information may include (1) the amount of data to send to the destination station B and (2) one or more initial rates selected by station B for data transmission to station B. The scheduler determines the payload (e.g., for all flows) to send on link (A, B) to station B (block 912). The scheduler also determines one or more final rates for transmission from station A to station B, as described below (block 914). The scheduler then computes the amount of time (or data time) needed to transmit the payload at the selected rate(s) (block 916). The scheduler also determines the amount of time (or overhead time) needed to transmit overhead for the data transmission, e.g., as described above for FIG. 8 (block 918). The scheduler then computes the TXOP duration for link (A, B) as the sum of the data time and the overhead time (block 920).

If the source station A is a user terminal, as determined in block 910, then the scheduler has information available at the destination station B. This information may include the amount of time requested by the source station A, which may be sent in a Duration Requested field in a reverse transmission from station A in a prior frame. The scheduler determines the amount of time requested by station A (block 922). If the requested duration is greater than zero, as determined in block 924, then the scheduler sets the TXOP duration for link (A, B) to the requested duration (block 926). Otherwise, if the requested duration is zero, which may be due to station A requesting no time or station B receiving the request from station A in error, then the scheduler sets the TXOP duration for link (A, B) to the amount of time needed for a short reverse transmission from station A to station B (block 928). This reverse transmission permits station A to request time on link (A, B) in case the buffer at station A builds up. This reverse transmission also allows for periodic updating of the channel state information so that accurate rate selection and rate control may be achieved in case data transmission is initiated. The scheduler may allocate a small amount of time for the reverse transmission, which may be just enough to send a MAC header and a pilot.

The scheduler uses the TXOP duration computed in block 920, 926, or 928 and assigns link (A, B) with this TXOP duration in block 728 in FIG. 7.

Figure 10:
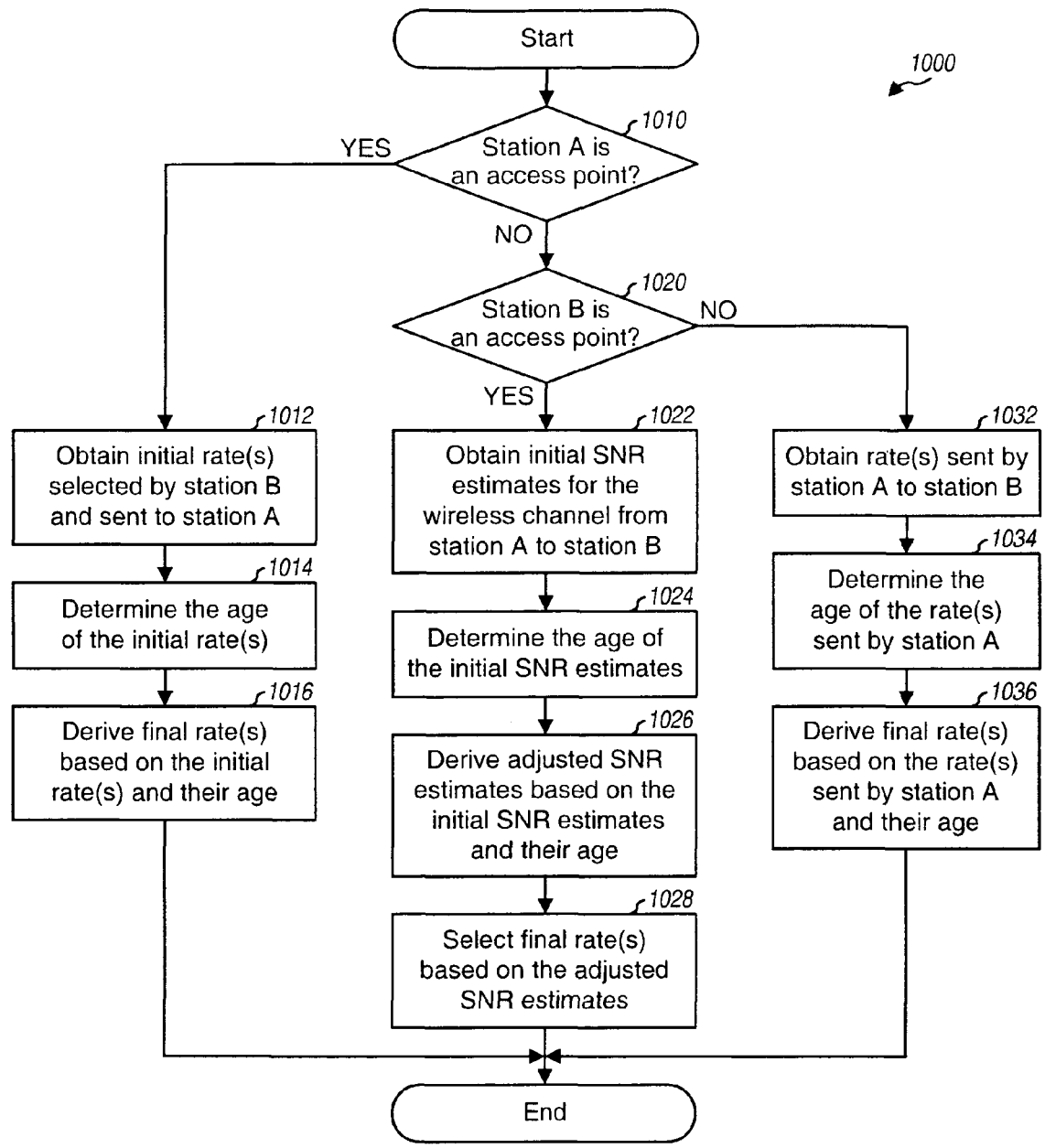
FIG. 10 shows a process for determining rates to use for transmission.

FIG. 10 shows a process 1000 for determining one or more rates to use for transmission from station A to station B. Process 1000 may be used for block 812 in FIG. 8 (albeit with stations A and B swapped) and for block 914 in FIG. 9.

In an embodiment, for a data transmission from an access point to a user terminal, the user terminal selects one or more initial rates based on a pilot received from the access point and sends the initial rate(s) to the access point via a reverse transmission. The scheduler then selects one or more final rates based on the initial rate(s) received from the user terminal. For a data transmission from the user terminal to the access point, the access point receives a pilot from the user terminal and selects one or more final rates to use for the data transmission. The access point then sends the final rate(s) to the user terminal via a reverse transmission. Different types of information are available to the scheduler depending on whether the access point is the source station A or the destination station B. The final rate(s) may be determined in different manners depending on the available information.

If the source station A is an access point, as determined in block 1010, then the scheduler obtains the initial rate(s) selected by station B and sent to station A (block 1012). The scheduler determines the age of the initial rate(s) (block 1014). The scheduler then derives final rate(s) based on the initial rate(s) and their age (block 1016). For example, the scheduler may discount or reduce the initial rate(s) based on the age of the initial rate(s), as described below.

If the destination station B is the access point, as determined in block 1020, then the scheduler obtains initial signal-to-noise ratio (SNR) estimates for the wireless channel from station A to station B based on a pilot received from station A (block 1022). The scheduler then determines the age of the initial SNR estimates (block 1024) and derives adjusted SNR estimates based on the initial SNR estimates and their age (block 1026). The scheduler may discount the initial SNR estimates based on the age of these SNR estimates, as described below. The scheduler then selects the final rate(s) based on the adjusted SNR estimates (block 1028). The scheduler may also discount the rates or SNR estimates by the amount of time between the current frame and the future frame in which the final rate(s) will be used.

If neither station A nor station B is the access point, which is the case if these stations are communicating peer to peer (via a Direct Link Protocol), then the access point does not relay traffic data between these stations. The scheduler may nevertheless manage the peer-to-peer communication. The access point may continually receive the transmissions sent by the user terminals within its coverage and read a Data Rate Vector (DRV) sent by these user terminals. The DRV describes the rates used on each of the data streams sent via a MIMO channel in order to allow the receiver to demodulate the transmission. The scheduler stores the DRV information as well as the time in which the DRV information was observed. If link (A, B) is selected for scheduling, then the scheduler obtains the rate(s) in the DRV information sent by station A to station B (block 1032). The scheduler also determines the age of the DRV (block 1034) and derives final rate(s) based on the initial rate(s) in the DRV, as selected by station A, and their age (block 1036). The access point thus snoops for DRVs sent peer to peer by the user terminals within its coverage, and the scheduler uses these DRVs to schedule peer-to-peer communication.

FIG. 10 shows the scheduler computing the final rate(s) to use for data transmission. Another entity may also perform the rate computation and provide the final rate(s) to the scheduler.

Figure 11:
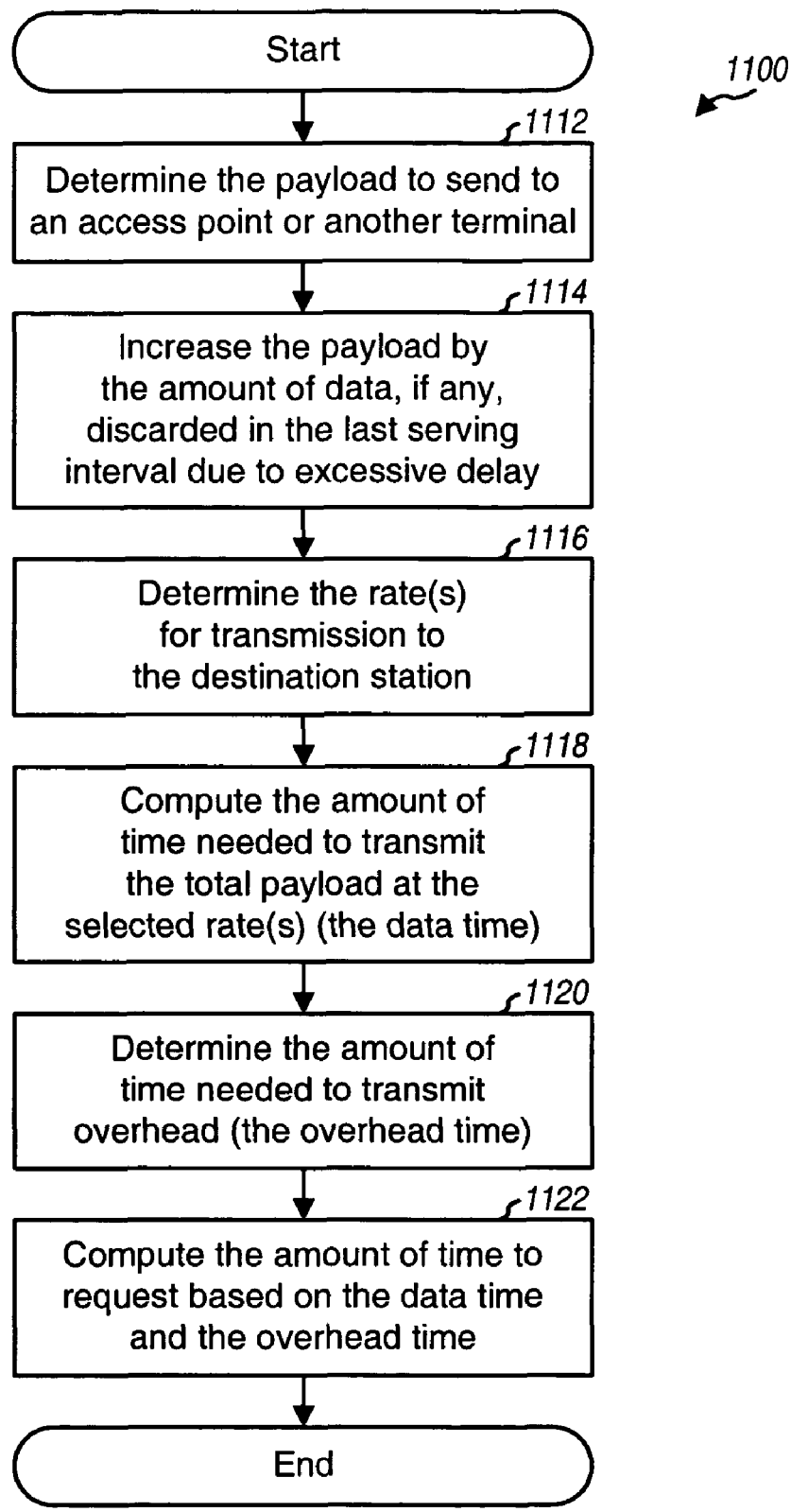
FIG. 11 shows a process for determining amount of time to request for transmission.

FIG. 11 shows a process 1100 for determining the amount of time to request for transmission. A user terminal may perform process 1100, e.g., whenever it has data to send. The user terminal determines the payload (e.g., for all flows) to send to the access point or another user terminal (block 1112). The user terminal increases the payload by the amount of data, if any, discarded in the last serving interval because the delay for the discarded data was exceeded (block 1114). Even though the discarded data will not be sent, increasing the payload will ensure that the user terminal requests for enough time to serve future data within the delay requirement so that no data will be discarded. The user terminal determines one or more rates for transmission to the destination station, e.g., using process 1000 in FIG. 10 (block 1116). The user terminal then computes the amount of time (or data time) needed to transmit the total payload at the selected rate(s) (block 1118). The user terminal also determines the amount of time (or overhead time) needed to transmit overhead for the data transmission, e.g., as described above in FIG. 8 (block 1120). The user terminal then computes the amount of time to request as the sum of the data time and the overhead time (block 1122). The user terminal then sends this requested time duration to the access point.

4. Transmission Mode and Rate Selection

Wireless network 100 may support multiple transmission modes for improved performance and greater flexibility. Table 3 lists some transmission modes and their short descriptions.

TABLE 3

| Transmission Mode | Description |
| --- | --- |
| Steered mode | Multiple data streams are transmitted on multiple orthogonal spatial channels (or eigenmodes) of a MIMO channel. |

TABLE 3-continued

| Transmission Mode | Description |
|---|---|
| Unsteered mode | Multiple data streams are transmitted on multiple spatial channels of the MIMO channel. |

The MIMO system may employ spatial spreading for the unsteered mode to enhance performance. With spatial spreading, which is also called pseudo-random transmit steering (PRTS), the source station performs spatial processing with different steering vectors so that the data transmission benefits from diversity gained observed over an ensemble of effective channels and is not stuck on a single bad channel realization for an extended period of time.

Each transmission mode has different capabilities and requirements. The steered mode can typically achieve better performance and may be used if the source station has sufficient channel or steering information to transmit data on orthogonal spatial channels. The unsteered mode does not need any channel information, but performance may not be as good as the steered mode. A suitable transmission mode may be selected for use depending on the available channel information, the capabilities of the source and destination stations, system requirements, and so on. For clarity, the following description is for a data transmission from a source (transmitting) station A to a destination (receiving) station B.

For the steered mode, station A transmits data on $N_S$ eigenmodes of a MIMO channel formed by the $N_T$ transmit antennas at station A and the $N_R$ receive antennas at station B, where $N_S \leq \min\{N_T, N_R\}$. The MIMO channel may be characterized by an $N_R \times N_T$ channel response matrix $\underline{H}$. For a wireless TDD MIMO network, the channel responses of the two opposite links may be assumed to be reciprocal of one another after a calibration procedure is performed to account for differences in the frequency responses of the transmit and receive RF chains. Thus, if $\underline{H}_{ab}$ is the channel response matrix for link (A, B) from station A to station B, then $\underline{H}_{ba} = \underline{H}_{ab}^T$ is the channel response matrix for link (B, A) from station B to station A, where $\underline{H}_{ab}^T$ is the transpose of $\underline{H}_{ab}$. For a reciprocal channel, station A can estimate the MIMO channel response for link (A, B) based on a MIMO pilot sent by station B to station A. Station A may then "diagonalize" $\underline{H}_{ab}$ (e.g., using singular value decomposition) to obtain eigenvectors used to transmit data on the eigenmodes of $\underline{H}_{ab}$. Eigensteering refers to spatial processing for the steered mode. The eigenvectors are steering vectors that allow for transmission on the eigenmodes.

For the unsteered mode, station A transmits data on $N_S$ spatial channels of the MIMO channel to station B. Station A may transmit up to $N_S$ data streams from its $N_T$ transmit antennas without any spatial processing. Station A may also perform spatial processing with steering vectors that are known to station B to achieve spatial spreading. Station A may also perform spatial spreading on both the MIMO pilot and the data sent to station B, in which case station B does not need to be aware of the spatial processing performed by station A.

A MIMO pilot is a pilot that allows a receiving station to characterize a MIMO channel. An unsteered MIMO pilot is a pilot comprised of N pilot transmissions sent from N transmit antennas, where the pilot transmission from each transmit antenna is identifiable by the receiving station. A steered MIMO pilot is a pilot sent on the eigenmodes of the MIMO channel. A steered MIMO pilot sent on link (A, B) may be generated based on eigenvectors for link (A, B), and these eigenvectors may be derived from either a steered MIMO pilot or an unsteered MIMO pilot received via link (B, A).

For the steered mode, station A uses eigenvectors to perform eigensteering. The frequency at which the eigenvectors change depends on variability in the MIMO channel. Station A may also use a different rate for each eigenmode. For the unsteered mode, station A may use the same rate for all spatial channels. The rate supported by each eigenmode or spatial channel is determined by the SNR achieved by that eigenmode/spatial channel. The SNRs for each link may be estimated each time a steered or unsteered MIMO pilot is received via that link. The receiving station may compute a set of rates supported by the link and send this rate information to the transmitting station.

In an embodiment, the particular transmission mode to use for data transmission is determined based on the age of the available channel information. The rates for the spatial channels are determined based on the SNR estimates for the spatial channels and their age. Each station may keep track of when MIMO pilots are transmitted to and received from other stations. Each station may use this information to determine the age and quality of the channel information that is currently available. Table 4 shows a list of variables used in the description below, which is for transmission mode and rate selection by station A for a data transmission from station A to station B.

TABLE 4

| Symbol | Description |
|---|---|
| $t_{tx}^u(A \rightarrow B, n)$ | The latest time that station A transmits an unsteered MIMO pilot to station B, as determined in frame n. |
| $t_{tx}^s(A \rightarrow B, n)$ | The latest time that station A transmits a steered MIMO pilot to station B, as determined in frame n. |
| $t_{rx}^u(A \leftarrow B, n)$ | The time at which station A receives the latest unsteered MIMO pilot from station B, as determined in frame n. |
| $t_{rx}^s(A \leftarrow B, n)$ | The time at which station A receives the latest steered MIMO pilot from station B, as determined in frame n. |
| $d_{pilot}^u$ | Processing delay for an unsteered MIMO pilot to obtain channel information |
| $d_{pilot}^s$ | Processing delay for a steered MIMO pilot to obtain channel information |
| $d_{snr}$ | Processing delay for a MIMO pilot to obtain SNR/rate information. |
| $Th_{age}^{steer}$ | Maximum age to permit use of the channel information. |
| $Th_{age}^{rate}$ | Maximum age to permit use of the SNR/rate information. |
| $SNR(A \leftarrow B, n)$ | Set of SNRs obtained by station A from station B, e.g., derived from initial rate(s) received from station B. |
| $t_{snr}(A \leftarrow B, n)$ | The time at which $SNR(A \leftarrow B, n)$ was obtained by station A. |

Station A may determine the age of the channel information available in the current frame n (or the "current channel information") as follows. If the current channel information is derived from an unsteered MIMO pilot received from station B, then the age of this information is equal to the age of the unsteered MIMO pilot. However, a delay of $d_{pilot}^u$ is incurred to process the unsteered MIMO pilot to obtain the channel information or, equivalently, the channel information is available $d_{pilot}^u$ seconds after receiving the unsteered MIMO pilot.

Thus, the latest unsteered MIMO pilot that could have been used to derive the current channel information was received at least $d_{pilot}^u$ seconds earlier. This latest unsteered MIMO pilot is sent in the latest frame $k_u$ that satisfies the following:

$$[t_{current} - t_{rx}^u(A \leftarrow B, k_u)] \geq d_{pilot}^u. \qquad \text{Eq (6)}$$

Equation (6) determines the most recent frame $k_u$ in which the unsteered MIMO pilot received in that frame could have been used to derive the current channel information. The age of the current channel information derived from the unsteered MIMO pilot may then be expressed as:

$$\text{Age}^u = t_{current} - t_{rx}^u(A \ominus B, k_u), \qquad \text{Eq (7)}$$

where $\text{Age}^u = -\infty$ if an unsteered MIMO pilot was not received.

If the current channel information is derived from a steered MIMO pilot received from station B, then the age of this information is equal to the age of the corresponding unsteered MIMO pilot from which the steered MIMO pilot is derived. A delay of $d_{pilot}^s$ is incurred by station A to process the steered MIMO pilot received from station B, and a delay of $d_{pilot}^u$ is incurred by station B to process the corresponding unsteered MIMO pilot sent by station A. Thus, the latest unsteered MIMO pilot that could have been used to derive the current channel information was received at least $d_{pilot}^s + d_{pilot}^u$ seconds earlier. This latest unsteered MIMO pilot is sent in the latest frame $k_s$ that satisfies the following:

$$[t_{current} - t_{rx}^s(A \leftarrow B, i)] \geq d_{pilot}^s \text{ AND } [t_{rx}^s(A \leftarrow B, i) - t_{tx}^u \\ (A \rightarrow B, k_s)] \geq d_{pilot}^u. \qquad \text{Eq (8)}$$

Equation (8) determines the most recent frame $k_s$ in which the unsteered MIMO pilot sent in that frame could have been used to derive the current channel information. The age of the current channel information derived from the steered MIMO pilot may then be expressed as:

$$\text{Age}^s = t_{current} - t_{tx}^u(A \rightarrow B, k_s), \qquad \text{Eq (9)}$$

where $\text{Age}^s = -\infty$ if a steered MIMO pilot was not received.

The age of the current channel information, $\text{Age}_{ch\_inf}(n)$, may be expressed as:

$$\text{Age}_{ch\_inf}(n) = \min(\text{Age}^u, \text{Age}^s). \qquad \text{Eq (10)}$$

A transmission mode may be selected based on the age of the current channel information, as follows:

$$\text{Transmission mode} = \qquad \text{Eq (11)}$$
$$\begin{cases} \text{Steered mode} & \text{if } \text{Age}_{ch\_inf}(n) \leq Th_{age}^{steer}, \\ \text{Unsteered mode} & \text{if } \text{Age}_{ch\_inf}(n) > Th_{age}^{steer}. \end{cases}$$

The transmission mode may also be selected based on other pertinent information such as the time variant nature of the MIMO channel. For example, $\text{Age}^u$ and $\text{Age}^s$ may be a function of channel type (e.g., fast or slow fading), different age thresholds may be used for different channel types, and so on.

Station A may select the final rate(s) for data transmission to station B based on the age of the underlying MIMO pilot used to derive these rate(s). The rate(s) supported by link (A, B) from station A to station B are dependent on the received SNRs at station B, which may be estimated based on a steered or unsteered MIMO pilot received from station A. Station B may convert the received SNRs to initial rate(s) and then send these initial rate(s) back to station A. Station A may estimate the received SNRs at station B based on the initial rate(s) obtained from station B. For example, station A may provide each initial rate to an inverse look-up table, which may then provide the required SNR for the initial rate. The set of SNRs available to station A in the current frame n (or the "current SNR information") is denoted as SNR(A←B,n) and is obtained at time $t_{snr}(A \leftarrow B, n)$.

A delay of $d_{snr}$ is incurred (1) for station B to process a steered or unsteered MIMO pilot, estimate the received SNRs, and send the initial rate(s) back to station A and (2) for station A to process the initial rate(s) to obtain the current SNR information. Thus, the latest MIMO pilot that could have been used to obtain the current SNR information was sent by station A at least $d_{snr}$ seconds earlier and may be identified as follows:

$$[t_{snr}(A \leftarrow B, n) - \max_i \{t_{tx}^u(A \rightarrow B, i), t_{tx}^s(A \rightarrow B, i)\}] \geq d_{snr}. \qquad \text{Eq (12)}$$

Equation (12) determines the most recent frame i in which the latest steered or unsteered MIMO pilot for that frame could have been used to derive the current SNR information. The age of the current SNR information may then be expressed as:

$$\text{Age}_{snr\_inf}(n) = t_{current} - \max\{t_{tx}^u(A \rightarrow B, i), t_{tx}^u(A \rightarrow B, i)\}. \qquad \text{Eq (13)}$$

The final rate(s) may be selected based on the current SNR information, the age of the SNR information, and possibly other information. For example, if the age of the current SNR information exceeds an SNR age threshold $$(\text{or } \text{Age}_{snr\_inf}(n) > Th_{age}^{snr}),$$

then the SNR information may be deemed to be too stale and discarded from use. In this case, the most robust transmission mode and the lowest rate (e.g., the lowest rate in the unsteered mode) may be used for data transmission to station B. If the age of the current SNR information is less than the SNR age threshold, then the SNRs obtained by station A may be adjusted based on the age of the SNR information, and the adjusted SNRs may then be used to select the final rate(s). The SNR adjustment may be performed in various manners.

If the steered mode is selected for use, then station A may receive an initial rate for each eigenmode, determine the required SNR for each eigenmode based on the initial rate for that eigenmode, and adjust the required SNR for each eigenmode based on the age of the SNR information. For example, an SNR back-off may be computed based on a linear function of age, as follows:

$$SNR_{age\_bo}(n) = \frac{SNR_{adj\_rate}}{\text{Age}_{snr\_inf}(n)}, \qquad \text{Eq (14)}$$

where $SNR_{adj\_rate}$ is the rate of adjustment for the SNR (e.g., $SNR_{adj\_rate} = 50$ dB/sec). The adjusted SNR for each eigenmode may then be computed as:

$$SNR_{adj,m}^s(n) = SNR_{req,m}(n) - SNR_{age\_bo}(n) - SNR_{bo}^s, \qquad \text{Eq (15)}$$

where $SNR_{req,m}(n)$ is the required SNR for eigenmode m (obtained from the initial rate);

$SNR_{bo}^s$ is a back-off for the steered mode (e.g., $SNR_{bo}^s = 0$ dB); and $SNR_{adj,m}^s(n)$ is the adjusted SNR for eigenmode m for the steered mode.

Station A may provide the adjusted SNR for each eigenmode to a look-up table, which then provides the final rate for that eigenmode. Station A may use the same look-up table that station B used to obtain the initial rate for each eigenmode, or a different look-up table.

If the unsteered mode is selected for use, then station A may receive an initial rate for each eigenmode and may determine a single final rate for data transmission in the unsteered mode. An adjusted SNR may be computed for each eigenmode as follows:

$$SNR_{adj,m}^u(n)=SNR_{req,m}(n)-SNR_{age\_bo}(n)-SNR_{bo}^u, \quad \text{Eq (16)}$$

where $SNR_{bo}^u$ is a back-off for the unsteered mode (e.g., $SNR_{bo}^u=3$ dB); and $SNR_{adj,m}^u(n)$ is the adjusted SNR for eigenmode m for the unsteered mode.

$SNR_{bo}^u$ may be used to account for various factors such as, e.g., the total transmit power being distributed over all $N_S$ spatial channels, loss in performance due to a variation in SNR across each data packet, and so on. $SNR_{bo}^u$, $SNR_{bo}^s$, and $SNR_{adj\_rate}$ may be determined by computer simulation, empirical measurements, and so on.

The number of spatial channels to use for data transmission in the current frame n, $N_{sch}(n)$, may be determined by counting the number of "good" eigenmodes with adjusted SNRs greater than an SNR threshold, $SNR_{th}$. For each eigenmode m, if $SNR_{adj,m}^u(n) \geq SNR_{th}$, then eigenmode m is counted for $N_{sch}(n)$. The number of spatial channels to use for the unsteered mode is thus less than or equal to the number of eigenmodes, or $N_{sch}(n) \leq N_S$. An average SNR for the unsteered mode, $SNR_{avg}(n)$, may be computed as follows:

$$SNR_{avg}(n) = 10\ \log_{10}\left(\frac{N_S}{N_{sch}(n)}\right) + \frac{1}{N_{sch}(n)} \cdot \sum_{m=1}^{N_S} SNR_{adj,m}^u(n). \quad \text{Eq (17)}$$

Station B selects the initial rate for each eigenmode based on an assumption that all $N_S$ eigenmodes are used for data transmission and that equal transmit power is used for all eigenmodes. If less than $N_S$ spatial channels are used for the unsteered mode, then higher transmit power may be used for each selected spatial channel. The first term to the right of the equal sign in equation (17) accounts for the use of higher transmit power for each spatial channel if less than $N_S$ spatial channels are selected for use. The second term to the right of the equal sign in equation (17) is the average SNR (in dB) for the $N_{sch}(n)$ spatial channels selected for use in frame n.

Station A may provide the average SNR to a look-up table, which then provides the final rate for the unsteered mode. Station A may use the same look-up table that station B used to obtain an initial rate for the unsteered mode, or a different look-up table. Alternatively, station A may receive a single initial rate for the unsteered mode from station B. In this case, station A may determine the required SNR for the unsteered mode based on the initial rate, adjust the required SNR based on the age of the SNR information, and determine the final rate for the unsteered mode based on the adjusted SNR.

The final rate(s) may also be determined based on other pertinent information such as the time variant nature of the MIMO channel. For example, the SNR back-off, $SNR_{age\_bo}(n)$, and/or the age threshold, $$Th_{age}^{rate},$$

May be a function of channel type (e.g., fast or slow fading). For simplicity, the SNR back-off was computed based on a linear function of age, as shown in equation (14). In general, the SNR back-off may be any linear or non-linear function of age and/or other parameters.

5. System

Figure 12:
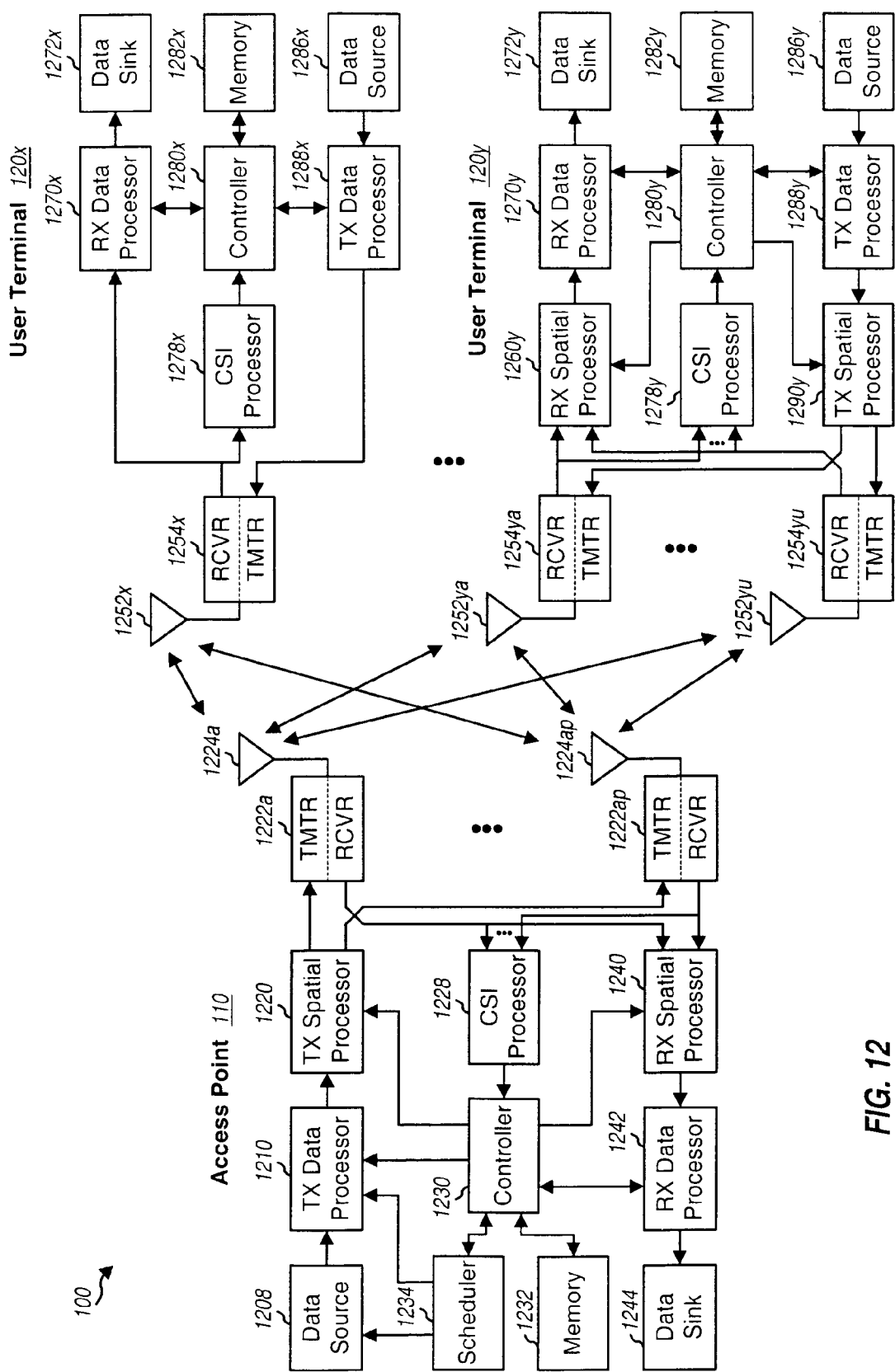
FIG. 12 shows a block diagram of an access point and two user terminals.

FIG. 12 shows a block diagram of access point 110 and two user terminals 120x and 120y in wireless network 100. Access point 110 is equipped with $N_{ap}$ antennas 1224a through 1224ap. User terminal 120x is equipped with a single antenna 1252x, and user terminal 120y is equipped with $N_{ut}$ antennas 1252ya through 1252yu.

On the uplink, at each user terminal 120 scheduled for uplink transmission, a transmit (TX) data processor 1288 receives traffic data from a data source 1286 and control data (e.g., a block ACK) from a controller 1280. TX data processor 1288 encodes, interleaves, and modulates the data based on the final rate(s) chosen for the user terminal and provides data symbols. At each user terminal with multiple antennas, a TX spatial processor 1290 performs spatial processing (if applicable) on the data symbols for the steered or unsteered mode and provides transmit symbols. Pilot symbols may be multiplexed with the data symbols or the transmit symbols as needed. Each transmitter unit (TMTR) 1254 processes (e.g., converts to analog, amplifies, filters, and frequency upconverts) a respective transmit symbol stream to generate an uplink signal. The uplink signal(s) from transmitter unit(s) 1254 are transmitted from antenna(s) 1252 to the access point.

At access point 110, $N_{ap}$ antennas 1224a through 1224ap receive the uplink signals from the user terminals. Each antenna 1224 provides a received signal to a respective receiver unit (RCVR) 1222, which processes the received signal and provides received symbols. A receive (RX) spatial processor 1240 performs receiver spatial processing on the received symbols from all receiver units 1222 and provides detected symbols, which are estimates of the data symbols sent by the user terminals. An RX data processor 1242 demodulates, deinterleaves, and decodes the detected symbols for each user terminal based on the final rate(s) used by that terminal. The decoded data for each user terminal is stored in a data sink 1244 and/or provided to a controller 1230.

On the downlink, at access point 110, a TX data processor 1210 receives traffic data from a data source 1208 for all user terminals scheduled for downlink transmission, control data (e.g., block ACKs) from a controller 1230, and scheduling information from a scheduler 1234. TX data processor 1210 encodes, interleaves, and modulates the data for each user terminal based on the final rate(s) chosen for that user terminal. A TX spatial processor 1220 performs spatial processing (if applicable) on the data symbols for each user terminal for the steered or unsteered mode, multiplexes in pilot symbols, and provides transmit symbols. Each transmitter unit 1222 processes a respective transmit symbol stream and generates a downlink signal. $N_{ap}$ downlink signals from $N_{ap}$ transmitter units 1222 are transmitted from $N_{ap}$ antennas 1224 to the user terminals.

At each user terminal 120, antenna(s) 1252 receive the downlink signals from access point 110. Each receiver unit 1254 processes a received signal from an associated antenna 1252 and provides received symbols. At each user terminal with multiple antennas, an RX spatial processor 1260 performs receiver spatial processing on the received symbols from all receiver units 1254 and provides detected symbols. An RX data processor 1270 demodulates, deinterleaves, and decodes the detected symbols and provides decoded data for the user terminal.

Controllers 1230, 1280x, and 1280y direct operation at access point 110 and user terminals 120x and 120y, respectively. Controller 1280 for each user terminal may send feedback information (e.g., the initial rate(s), the requested duration, and so on) to the access point. Memory units 1232, 1282x, and 1282y store program codes and data used by controllers 1230, 1280x, and 1280y, respectively. Scheduler 1234 performs scheduling for the access point and user terminals, as described above. Scheduler 1234 may reside at the access point, as shown in FIG. 12, or at another network entity.

Figure 13:
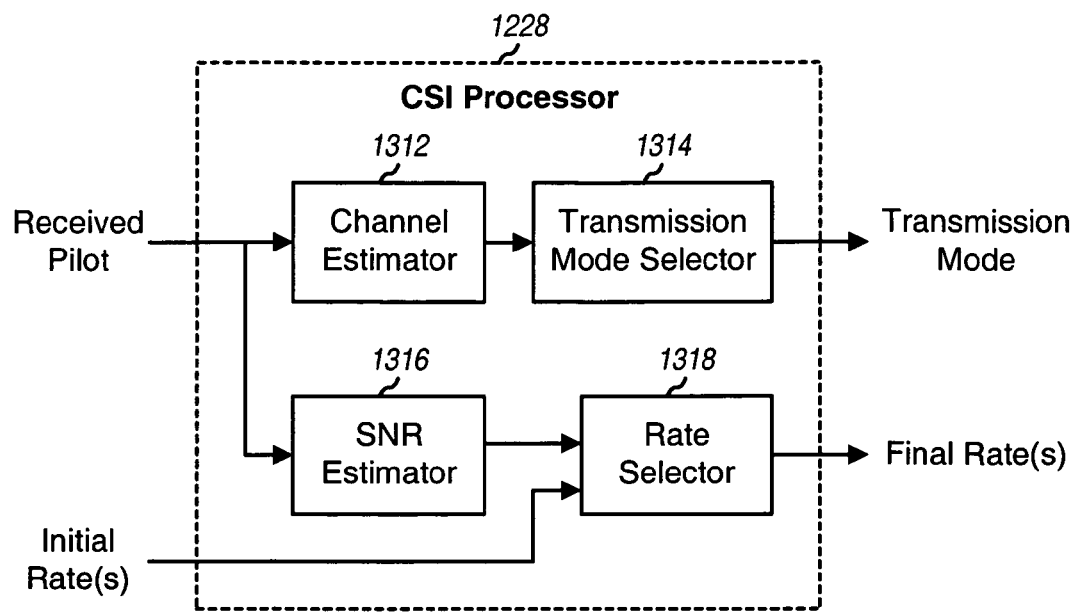
FIG. 13 shows a block diagram of a CSI processor at the access point.

FIG. 13 shows a block diagram of an embodiment of a CSI processor 1228 at access point 110. A channel estimator 1312 receives the pilot sent by each user terminal transmitting on the uplink and derives a channel response estimate for the user terminal. A transmission mode selector 1314 selects either the steered or unsteered mode for each user terminal with multiple antennas, e.g., based on the channel information and its age, as described above. An SNR estimator 1316 estimates the SNRs for each user terminal based on the pilot received from the user terminal. A rate selector 1318 determines the final rate(s) for each user terminal based on either the SNR estimates from SNR estimator 1316 or the initial rate(s) sent by the user terminal, as described above. CSI processor 1278 for each user terminal may also be implemented in similar manner as CSI processor 1228.

Figure 14:
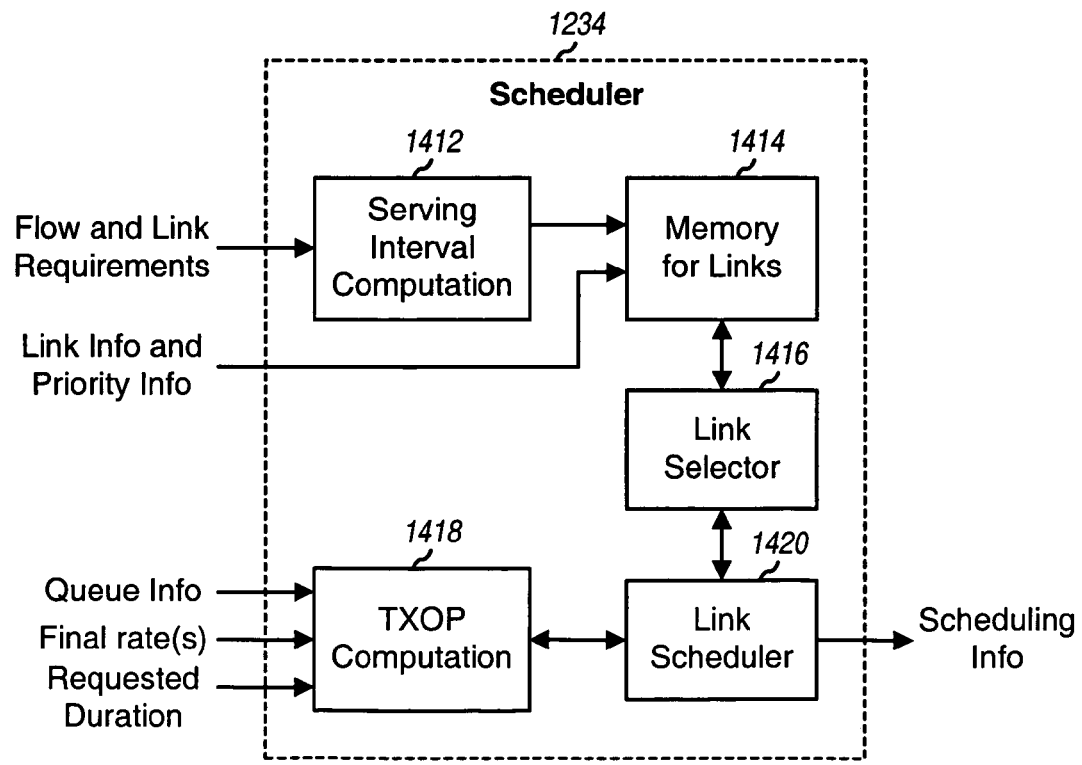
FIG. 14 shows a block diagram of a scheduler.

FIG. 14 shows a block diagram of an embodiment of scheduler 1234 at access point 110. A computation unit 1412 receives the throughput, delay, and/or other requirements for the flows on each link that has registered with scheduler 1234 and computes the serving interval for the link, as described above. A memory unit 1414 stores information for each registered link such as its serving interval, the last served time, the status flag, priority information, and so on. A link selector 1416 selects links for transmission based on their serving intervals and/or other criteria. A computation unit 1418 computes the TXOP duration for each selected link based on (1) the queue/buffer information and rate(s) for the link or (2) the requested duration for the link. A link scheduler 1420 assigns the selected links with the TXOPs computed by unit 1418, updates the scheduled links, and provides scheduling information for the scheduled links.

Link selector 1416 and link scheduler 1420 may perform the processes shown in FIGS. 6 and 7. Computation unit 1418 may perform the processes shown in FIGS. 8 and 9. Rate selector 1318 in FIG. 13 may perform the processes shown in FIGS. 10 and 11.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling transmission over a wireless network, comprising:
   obtaining a feedback requirement specifying a required rate for sending acknowledgments for at least one flow of data;
   selecting a serving interval for each flow based on the feedback requirement for the flow, wherein each selected serving interval corresponds to a given time duration;
   scheduling the at least one flow for transmission based on the selected serving interval for the at least one flow, each flow being scheduled at least once within each serving interval for the flow if system resources are available; and
   transmitting the at least one flow over the wireless network according to the scheduling.

2. The method of claim 1, wherein the at least one flow comprises multiple flows having different serving intervals.

3. The method of claim 1, wherein the scheduling the at least one flow for transmission comprises
scheduling each flow with at least one transmission opportunity (TXOP) in each serving interval for the flow if system resources are available.

4. The method of claim 1, further comprising:
determining a delay requirement for each flow; and
selecting the serving interval for each flow to meet the delay requirement for the flow.

5. The method of claim 1, further comprising:
determining a delay requirement for each flow;
determining number of transmissions allowed for any one data unit; and
selecting the serving interval for each flow based on the delay requirement for the flow and the number of transmissions allowed for any one data unit.

6. The method of claim 1, further comprising:
determining a throughput requirement for each flow; and
selecting the serving interval for each flow to meet the throughput requirement for the flow.

7. The method of claim 1, further comprising:
determining a required packet error rate (PER) for each flow; and
selecting the serving interval for each flow to meet the PER requirement for the flow.

8. An apparatus in a wireless network, comprising:
a controller operative to obtain a feedback requirement specifying a required rate for sending acknowledgments for at least one flow of data; and
a scheduler operative to select a serving interval for each flow based on the feedback requirement for the flow, wherein each selected serving interval corresponds to a given time duration, to schedule the at least one flow for transmission based on the selected serving interval for the at least one flow, and to schedule each flow at least once within each serving interval for the flow if system resources are available.

9. The apparatus of claim 8, wherein the at least one flow comprises multiple flows having different serving intervals.

10. The apparatus of claim 8, wherein the scheduler is further operative to schedule each flow with at least one transmission opportunity (TXOP) in each serving interval for the flow if system resources are available.

11. The apparatus of claim 8, wherein the wireless network supports multiple-input multiple-output (MIMO) transmission.

12. An apparatus in a wireless network, comprising: P1 means for obtaining a feedback requirement specifying a required rate for sending acknowledgments for at least one flow of data;
means for selecting a serving interval for each flow based on the feedback requirement for the flow, wherein each selected serving interval corresponds to a given time duration; and
means for scheduling the at least one flow for transmission based on the selected serving interval for the at least one flow, each flow being scheduled at least once within each serving interval for the flow if system resources are available.

13. The apparatus of claim 12, wherein the at least one flow comprises multiple flows having different serving intervals.

14. The apparatus of claim 12, wherein the means for scheduling the at least one flow for transmission comprises means for scheduling each flow with at least one transmission opportunity (TXOP) in each serving interval for the flow if system resources are available.

15. A method of scheduling transmission over a wireless network, comprising:
identifying at least one link, each link carrying at least one flow of data;
obtaining a feedback requirement specifying a required rate for sending acknowledgments for the at least one flow for each link;
selecting a serving interval for each link based on the feedback requirement for the at least one flow for the link, wherein each selected serving interval corresponds to a given time duration; and
scheduling the at least one link for transmission based on the selected serving interval for the at least one flow for each link, each link being scheduled at least once within each serving interval for the link if system resources are available; and
transmitting the at least one flow over the wireless network according to the scheduling.

16. The method of claim 15, wherein the at least one link comprises multiple links having different serving intervals.

17. The method of claim 15, further comprising:
for each of the at least one link,
determining a serving interval for each flow for the link based on requirements, if any, for the flow, and
determining the serving interval for the link based on at least one serving interval determined for the at least one flow for the link.

18. The method of claim 15, further comprising:
scheduling each link with at least one transmission opportunity (TXOP) in each serving interval for the link if system resources are available.

19. An apparatus in a wireless network, comprising:
a controller operative to identify at least one link, each link carrying at least one flow of data, and to obtain a feedback requirement specifying a required rate for sending acknowledgments for the at least one flow for each link; and
a scheduler operative to select a serving interval for each link based on the feedback requirement for the at least one flow for the link, wherein each selected serving interval corresponds to a given time duration, and to schedule the at least one link for transmission based on the selected serving interval for the at least one flow for each link, each link being scheduled at least once within each serving interval for the link if system resources are available.

20. The apparatus of claim 19, wherein the at least one link comprises multiple links having different serving intervals.

21. The apparatus of claim 19, wherein the scheduler is further operative to schedule each link with at least one transmission opportunity (TXOP) in each serving interval for the link if system resources are available.

22. An apparatus in a wireless network, comprising:
means for identifying at least one link, each link carrying at least one flow of data;
means for obtaining a feedback requirement specifying a required rate for sending acknowledgments for the at least one flow for each link;
means for selecting a serving interval for each link based on the feedback requirement for the at least one flow for the link, wherein each selected serving interval corresponds to a given time duration; and
means for scheduling the at least one link for transmission based on the selected serving interval for the at least one flow for each link, each link being scheduled at least once within each serving interval for the link if system resources are available.

23. The apparatus of claim 22, wherein the at least one link comprises multiple links having different serving intervals.

24. The apparatus of claim 22, wherein the means for scheduling the at least one link for transmission comprises
means for scheduling each link with at least one transmission opportunity (TXOP) in each serving interval for the link if system resources are available.

25. A method of scheduling data transmission, comprising:
identifying at least one link to schedule for data transmission based on feedback requirements specifying required rates for sending acknowledgments for the at least one link, each link being for a specific source station and a specific destination station;
determining a transmission opportunity (TXOP) for each of the at least one link based on the feedback requirements, wherein each selected TXOP corresponds to a given time duration; and
scheduling each link with the TXOP determined for the link.

26. The method of claim 25, wherein the identifying the at least one link to schedule for data transmission comprises
identifying links that have not been scheduled for data transmission within serving intervals for the links.

27. The method of claim 25, wherein the identifying the at least one link to schedule for data transmission comprises
identifying links that have not been served in a prior scheduling interval to meet requirements of the links.

28. The method of claim 25, wherein the determining the TXOP for each of the at least one link comprises
determining amount of data to send for the link,
determining at least one rate to use for the link, and
computing duration of the TXOP for the link based on the amount of data to send and the at least one rate for the link.

29. The method of claim 25, wherein the determining the TXOP for each of the at least one link comprises
determining duration of the TXOP for the link based on a requested duration for the link.

30. The method of claim 25, further comprising:
sorting the at least one link based on priority, and wherein the at least one link is scheduled in a sorted order.

31. The method of claim 25, further comprising:
sorting the at least one link based on delay requirements for the at least one link, and wherein the at least one link is scheduled in a sorted order.

32. An apparatus in a wireless network, comprising:
a selector operative to identify at least one link to schedule for data transmission based on feedback requirements specifying required rates for sending acknowledgments for the at least one link, each link being for a specific source station and a specific destination station;
a computation unit operative to determine a transmission opportunity (TXOP) for each of the at least one link based on the feedback requirements, wherein each selected TXOP corresponds to a given time duration; and
a scheduler operative to schedule each link with the TXOP determined for the link.

33. The apparatus of claim 32, wherein the selector is operative to identify links that have not been scheduled for data transmission within serving intervals for the links.

34. The apparatus of claim 32, wherein the computation unit is operative to determine duration of the TXOP for each link based on a requested duration for the link or a buffer size and at least one rate for the link.

35. An apparatus in a wireless network, comprising:
means for identifying at least one link to schedule for data transmission based on feedback requirements specifying required rates for sending acknowledgments for the at least one link, each link being for a specific source station and a specific destination station;
means for determining a transmission opportunity (TXOP) for each of the at least one link based on the feedback requirements, wherein each selected TXOP corresponds to a given time duration; and
means for scheduling each link with the TXOP determined for the link.

36. The apparatus of claim 35, wherein the means for identifying at least one link to schedule for data transmission comprises
means for identifying links that have not been scheduled for data transmission within serving intervals for the links.

37. The apparatus of claim 35, further comprising:
means for determining duration of the TXOP for each link based on a requested duration for the link or a buffer size and at least one rate for the link.

38. A non-transitory computer-readable storage medium comprising code, which, when executed by a processor, causes the processor to perform operations for scheduling in a wireless network, the computer-readable storage medium comprising:
code for obtaining a feedback requirement specifying a required rate for sending acknowledgments for at least one flow of data;
code for selecting a serving interval for each flow based on the feedback requirement for the flow, wherein each selected serving interval corresponds to a given time duration; and
code for scheduling the at least one flow for transmission based on the selected serving interval for the at least one flow, each flow being scheduled at least once within each serving interval for the flow if system resources are available.

39. The non-transitory computer-readable storage medium of claim 38, wherein the at least one flow comprises multiple flows having different serving intervals.

40. The non-transitory computer-readable storage medium of claim 38, wherein the code for scheduling the at least one flow for transmission comprises
code for scheduling each flow with at least one transmission opportunity (TXOP) in each serving interval for the flow if system resources are available.

41. A non-transitory computer-readable storage medium comprising code, which, when executed by a processor, causes the processor to perform operations for scheduling in a wireless network, the computer-readable storage medium comprising:
code for identifying at least one link, each link carrying at least one flow of data;
code for obtaining a feedback requirement specifying a required rate for sending acknowledgments for the at least one flow for each link;
code for selecting a serving interval for each link based on the feedback requirement for the at least one flow for the link, wherein each selected serving interval corresponds to a given time duration; and
code for scheduling the at least one link for transmission based on the selected serving interval for the at least one flow for each link, each link being scheduled at least once within each serving interval for the link if system resources are available.

42. The non-transitory computer-readable storage medium of claim 41, wherein the at least one link comprises multiple links having different serving intervals.

43. The non-transitory computer-readable storage medium of claim 41, wherein the code for scheduling the at least one link for transmission comprises code for scheduling each link with at least one transmission opportunity (TXOP) in each serving interval for the link if system resources are available.

44. A non-transitory computer-readable storage medium comprising code, which, when executed by a processor, causes the processor to perform operations for scheduling in a wireless network, the computer-readable storage medium comprising:

code for identifying at least one link to schedule for data transmission based on feedback requirements specifying required rates for sending acknowledgments for the at least one link, each link being for a specific source station and a specific destination station;

code for determining a transmission opportunity (TXOP) for each of the at least one link based on the feedback requirements, wherein each selected TXOP corresponds to a given time duration; and code for scheduling each link with the TXOP determined for the link.

45. The non-transitory computer-readable storage medium of claim 44, wherein the code for identifying at least one link to schedule for data transmission comprises code for identifying links that have not been scheduled for data transmission within serving intervals for the links.

46. The non-transitory computer-readable storage medium of claim 44, further comprising:

code for determining duration of the TXOP for each link based on a requested duration for the link or a buffer size and at least one rate for the link.

* * * * *